United States Patent [19]
Takamoto et al.

[11] Patent Number: 6,028,715
[45] Date of Patent: Feb. 22, 2000

[54] VARIABLE MAGNIFICATION OPTICAL SYSTEM

[75] Inventors: Katsuhiro Takamoto, Sakai; Masakuni Tai, Machida, both of Japan

[73] Assignee: Minolta Co., Ltd., Osaka, Japan

[21] Appl. No.: 08/978,239

[22] Filed: Nov. 25, 1997

[30] Foreign Application Priority Data

Nov. 27, 1996 [JP] Japan ................................ 8-316013

[51] Int. Cl.$^7$ ................................................. G02B 15/14
[52] U.S. Cl. ............................................. 359/688; 359/683
[58] Field of Search .................................. 359/688, 649, 359/650, 686, 683, 676

[56] References Cited

FOREIGN PATENT DOCUMENTS

| 3-58490 | 8/1995 | Japan . |
|---|---|---|
| 7-218837 | 8/1995 | Japan . |
| 8-201690 | 8/1996 | Japan . |

*Primary Examiner*—Georgia Epps
*Assistant Examiner*—Jordan M. Schwartz
*Attorney, Agent, or Firm*—Sidley & Austin

[57] ABSTRACT

A variable magnification optical system for projecting images from a small-sized, high-resolution display device consists of, from the projection side, a first lens unit having a positive optical power, a second lens unit having a negative optical power, a third lens unit having a negative optical power, and a fourth lens unit having a positive optical power and kept in a fixed position during magnification adjustment. The optical system achieves magnification adjustment by moving at least the second and third lens units along the optical axis, and has at least one negative lens element in the second lens unit, at least one negative lens element in the third lens unit, and at least one positive lens element in the fourth lens unit made of lens materials having predetermined anomalous dispersions and predetermined Abbe numbers.

13 Claims, 21 Drawing Sheets

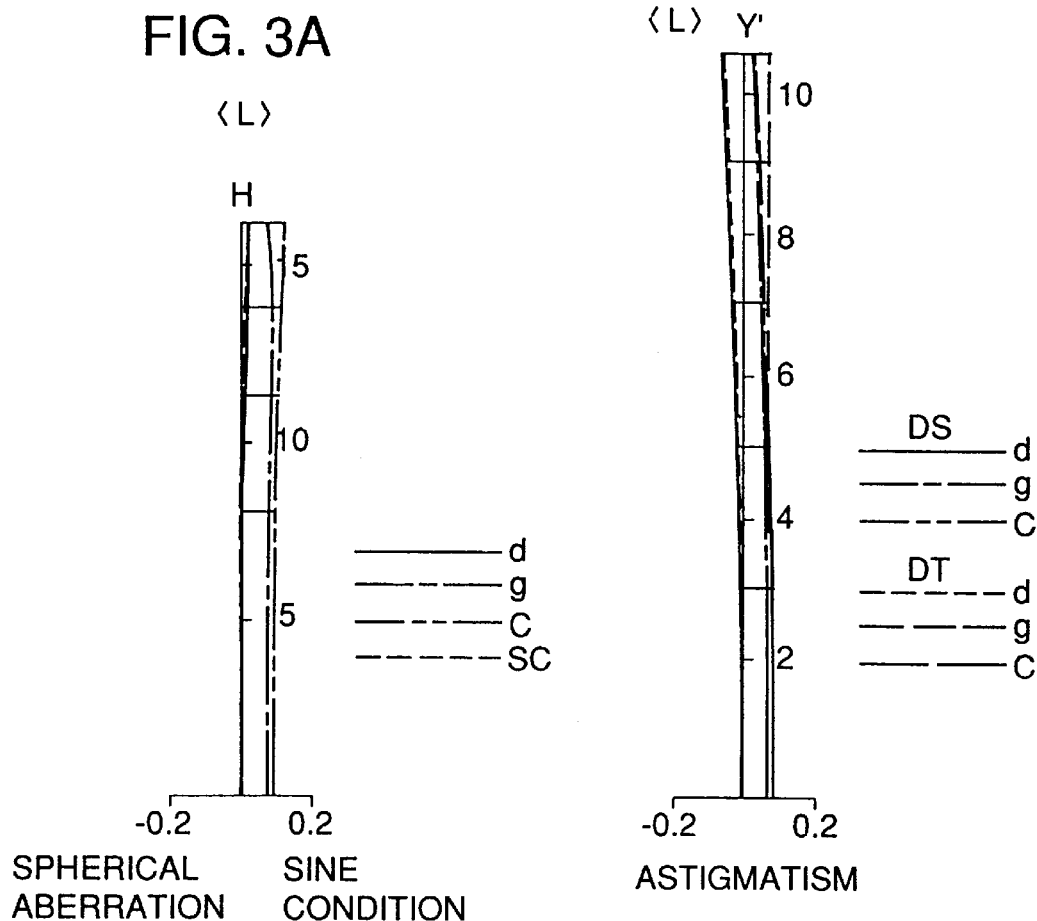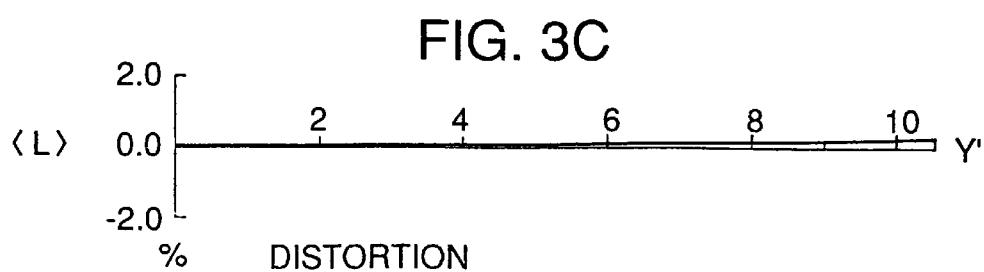

SPHERICAL ABERRATION  SINE CONDITION

ASTIGMATISM

DISTORTION

LATERAL CHROMATIC ABERRATION

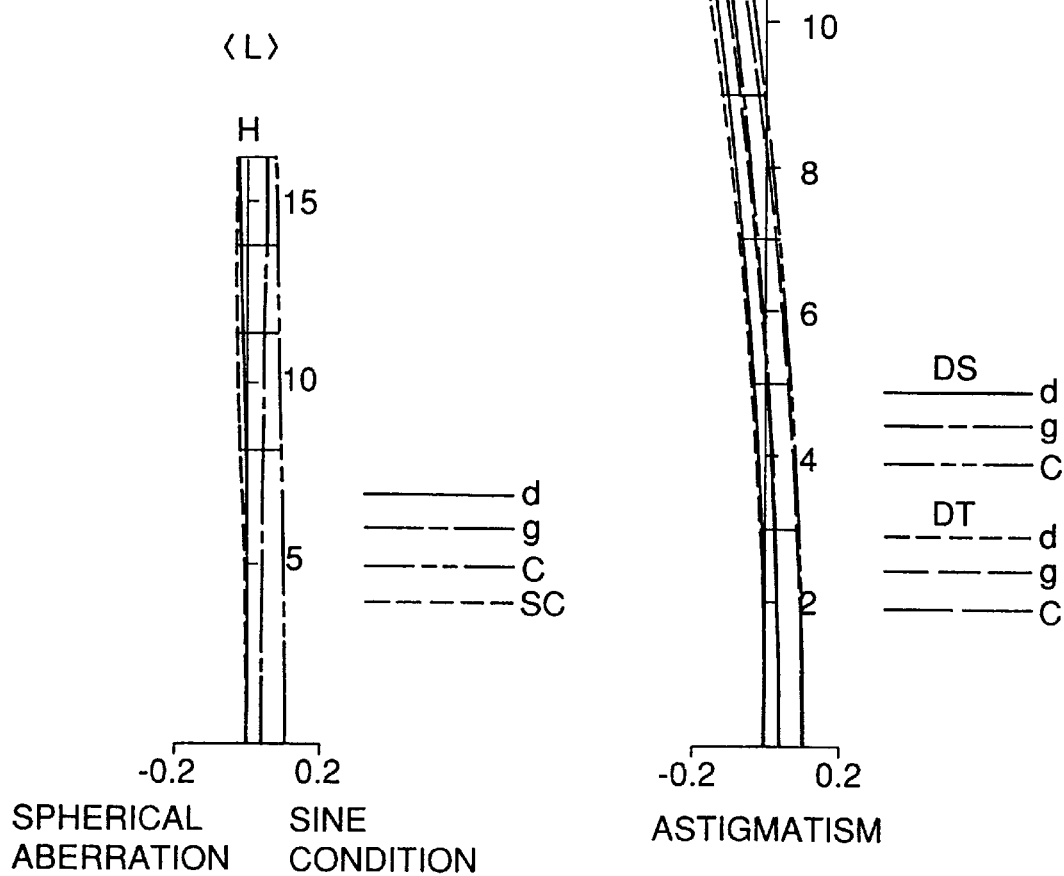
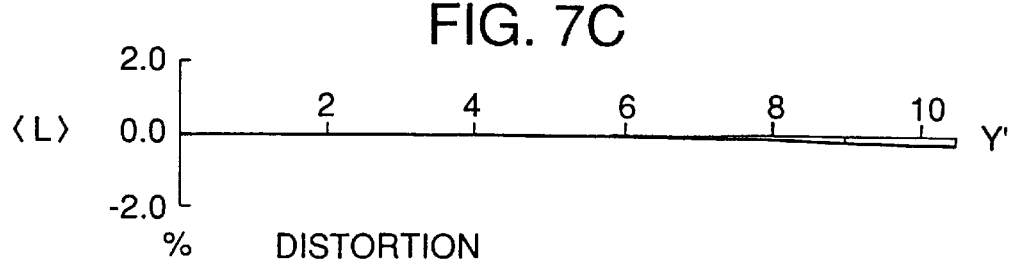
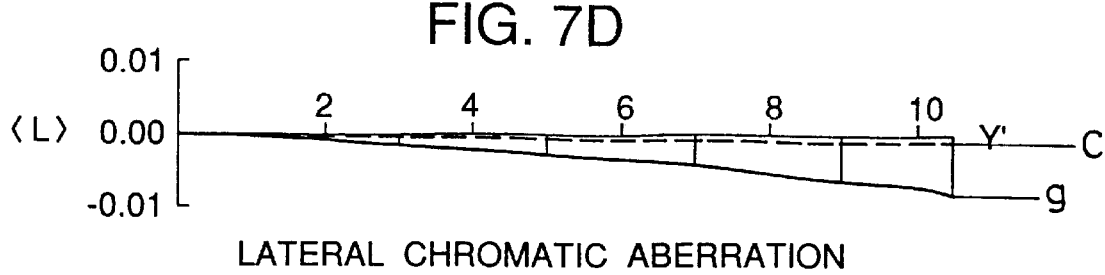

SPHERICAL ABERRATION  SINE CONDITION

ASTIGMATISM

DISTORTION

LATERAL CHROMATIC ABERRATION

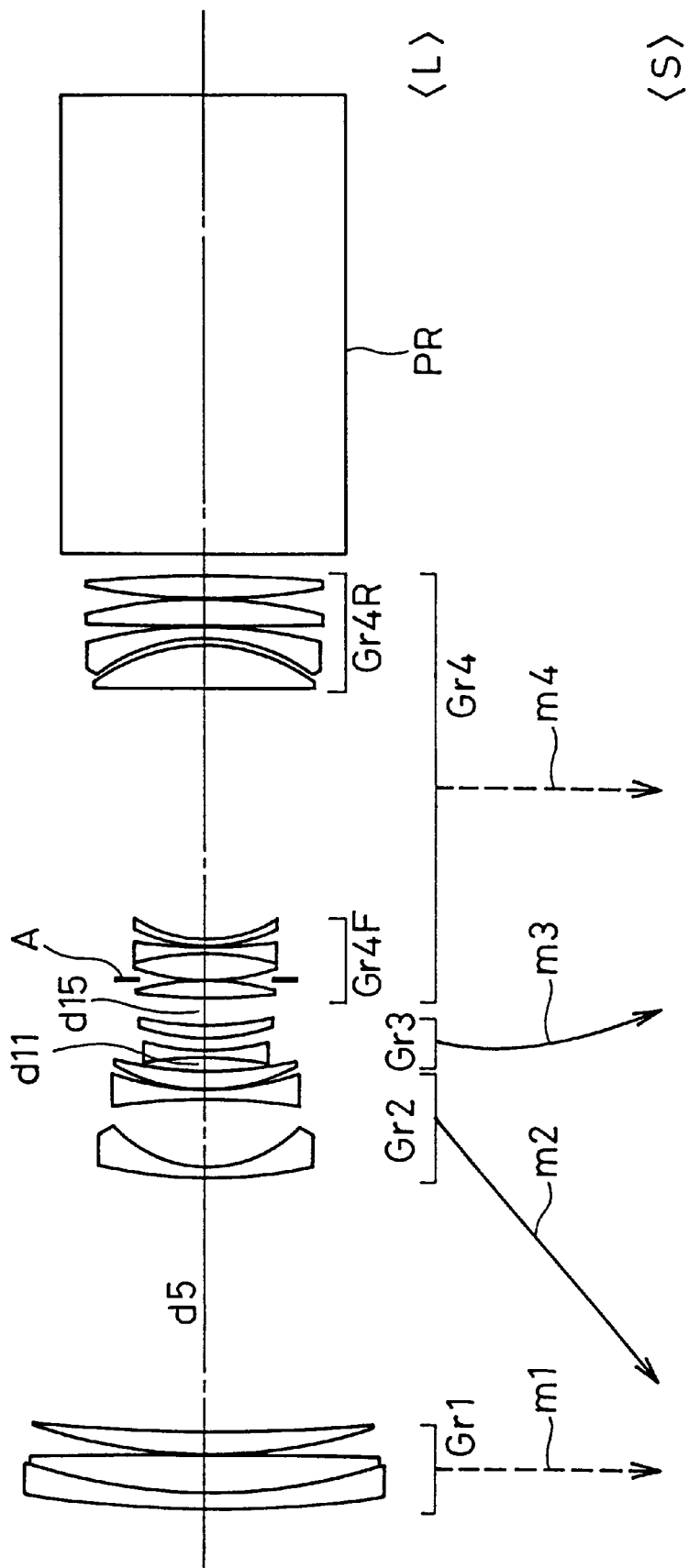

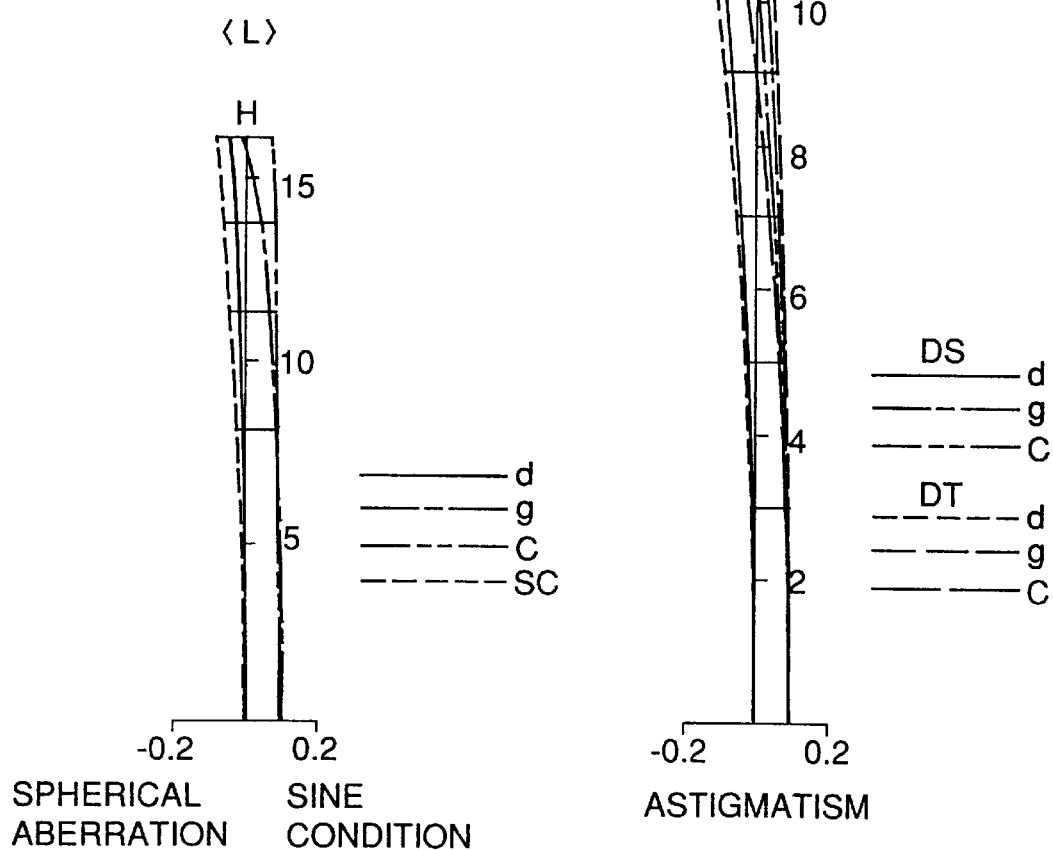
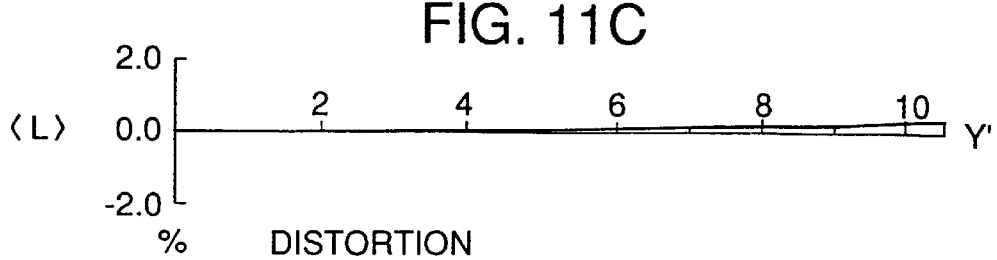
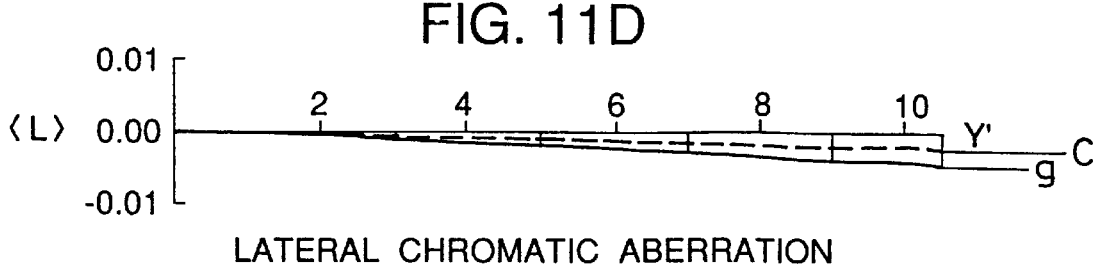

SPHERICAL ABERRATION / SINE CONDITION

ASTIGMATISM

% DISTORTION

LATERAL CHROMATIC ABERRATION

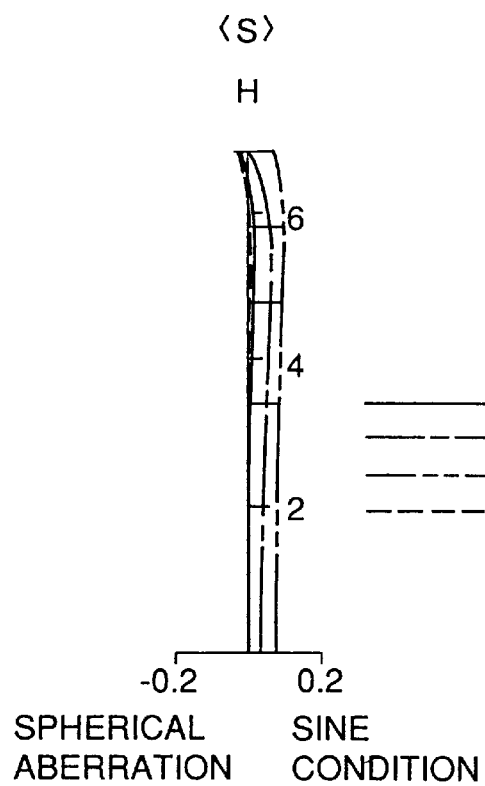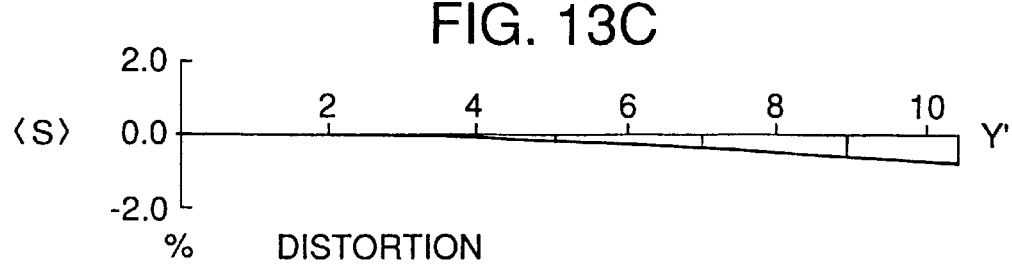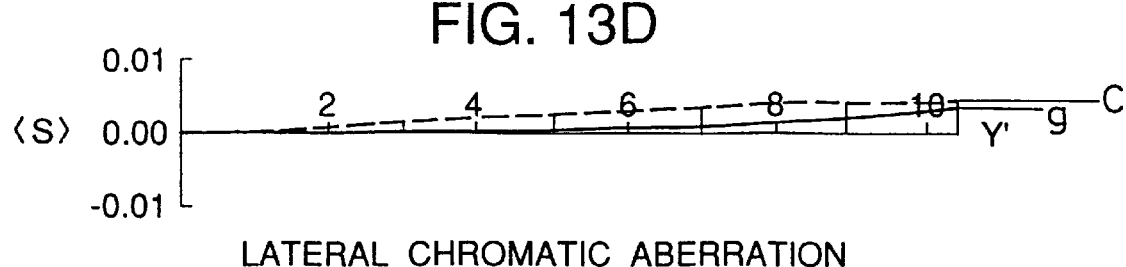

SPHERICAL ABERRATION    SINE CONDITION

ASTIGMATISM

DISTORTION

LATERAL CHROMATIC ABERRATION

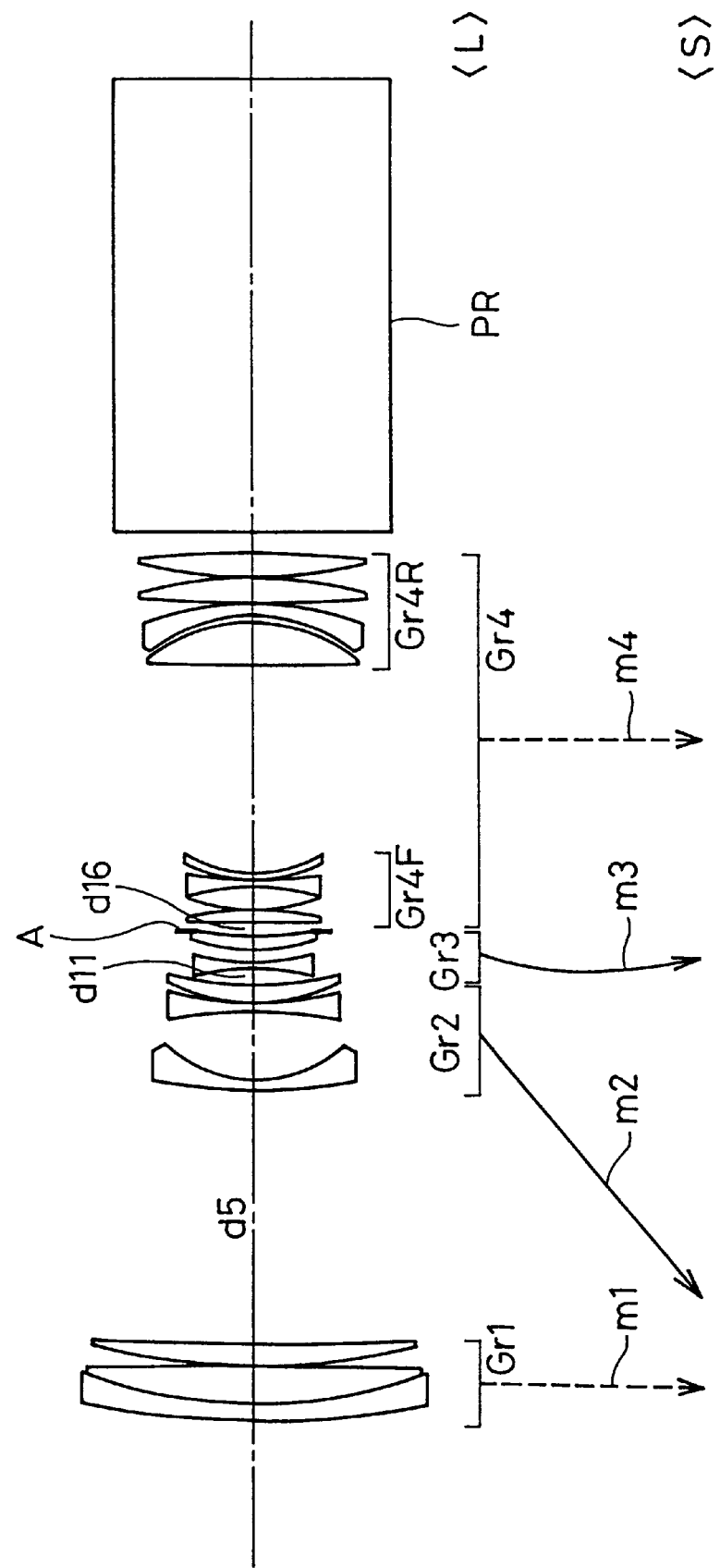

SPHERICAL ABERRATION / SINE CONDITION

ASTIGMATISM

DISTORTION

LATERAL CHROMATIC ABERRATION

SPHERICAL ABERRATION  SINE CONDITION

ASTIGMATISM

DISTORTION

LATERAL CHROMATIC ABERRATION

VARIABLE MAGNIFICATION OPTICAL SYSTEM

BACKGROUND OF THE INVENTION

1. Field of the Invention

The present invention relates to a variable magnification optical system, and particularly to a variable magnification optical system suitable for use as a projection optical system in a projection apparatus (for example, a liquid crystal projector for projecting an image from a display device such as a liquid crystal panel onto a screen).

2. Description of the Prior Art

In recent years, as the use of personal computers prevail, liquid crystal projectors are in wider and wider use as a presentation tool in business and other scenes. On the other hand, an increasing demand is expected for liquid crystal projectors that are used at home to realize so-called home theaters. Conventionally, for such uses, single-panel or three-panel liquid crystal projectors of a front-projection type, having resolutions of 100,000 to 300,000 pixels, have been introduced on the market.

Variable magnification optical systems for use as projection optical systems in such liquid crystal projectors are proposed, for example, in Japanese Laid-open Patent Applications Nos. H7-218837 and H8-201690. Both of these Patent Applications disclose variable magnification optical systems consisting of three lens units, and more particularly positive, negative, and positive lens units, and these optical systems offer satisfactory optical performance as long as they are used to project images obtained from conventional display devices. However, these optical systems are not suitable for use with display devices having higher resolutions, because the latter demand more thorough reduction of lateral chromatic aberration than can typically be achieved in the former.

A variable magnification optical system that suffers from relatively small lateral chromatic aberration is proposed in Japanese Published Patent No. H3-58490. This optical system, designed for enlargement of film images, consists of three, i.e. positive, negative, and positive lens units, and is so constituted that variation of lateral chromatic aberration as occurs while the magnification is being varied for adjustment is reduced by a negative lens element made of anomalous-dispersion glass provided in the second lens unit. However, even this optical system does not achieve sufficient reduction of lateral chromatic aberration as is required to properly project images obtained from higher-resolution display devices.

Nowadays, higher image quality is sought after in liquid crystal projectors. For example, for presentation purposes, projectors having resolutions higher than 800×600 pixels (SVGA) are preferred to those having a conventional 640× 480 pixels (VGA). Even in home-use projectors, horizontal resolutions higher than 400 scan lines are preferable, now that high-definition television services such as Japan's Hi-Vision have gone into operation. To satisfy such requirements for higher image quality, display devices such as liquid crystal panels have come to offer higher resolutions and, in line with this, liquid crystal projectors have come to typically adopt a three-panel design employing a dichroic prism. In addition, to make projectors as compact as possible, display devices such as liquid crystal panels are made smaller and smaller. To achieve proper projection of images obtained from such a display device that has a smaller size and offers a higher resolution than ever, it is essential to use a variable magnification projection optical system that offers higher optical performance than ever. However, as noted previously, conventional variable magnification projection optical systems do not offer sufficiently high optical performance (in particular, lateral chromatic aberration correction performance) for such applications.

SUMMARY OF THE INVENTION

An object of the present invention is to provide a variable magnification optical system that causes minimal lateral chromatic aberration and that can thus be used suitably to project images obtained from a small-sized, high-resolution display device.

To achieve the above object, according to one aspect of the present invention, a variable magnification optical system is provided with, from the enlargement side, a first lens unit having a positive optical power; a second lens unit having a negative optical power and including a first negative lens element, said second lens unit being moved along the optical axis during the varying of the magnification of the entire optical system; a third lens unit having a negative optical power and including a second negative lens element, said third lens unit being moved along the optical axis during the varying of the magnification of the entire optical system; and a fourth lens unit having a positive optical power and including a first positive lens element, said fourth lens unit being fixed in the optical axis direction during the varying of the magnification of the entire optical system. In addition, in this variable magnification optical system, the optical materials of said first and second negative lens elements and said first lens element fulfill the following conditions:

$$0.015 < \Theta - (0.644 - 0.00168 \cdot vd) < 0.06$$

$$65 < vd < 100$$

where $$\Theta = (ng - nE)/(nF - nC);$$

$$vd = (nd - 1)/(nF - nC);$$

where ng represents the refractive index for g-line (whose wavelength is 435.84 nm);

nF represents the refractive index for F-line (whose wavelength is 486.13 nm);

nC represents the refractive index for C-line (whose wavelength is 656.28 nm); and nd represents the refractive index for d-line (whose wavelength is 587.56 nm).

According to another aspect of the present invention, a method for correcting lateral chromatic aberration in a variable magnification is provided by an optical system provided with, from the enlargement side, a first lens unit having a positive optical power; a second lens unit having a negative optical power and including a first negative lens element, said second lens unit being moved along the optical axis during the varying of the magnification of the entire optical system; a third lens unit having a negative optical power and including a second negative lens element, said third lens unit being moved along the optical axis during the varying of the magnification of the entire optical system; and a fourth lens unit having a positive optical power and including a first positive lens element, said fourth lens unit being fixed in the optical axis direction during the varying of the magnification of the entire optical system, is characterized in that the lateral chromatic aberration is corrected by selecting optical materials of said first and second negative lens elements and said first lens element so that the materials fulfill the following conditions:

$$0.015 < \Theta - (0.644 - 0.00168 \cdot \nu d) < 0.06$$

$$65 < \nu d < 100$$

where $$\Theta = (n g - n F)/(n F - n C);$$

$$\nu d = (n d - 1)/(n F - n C);$$

where ng represents the refractive index for g-line (whose wavelength is 435.84 nm);

nF represents the refractive index for F-line (whose wavelength is 486.13 nm);

nC represents the refractive index for C-line (whose wavelength is 656.28 nm); and nd represents the refractive index for d-line (whose wavelength is 587.56 nm).

BRIEF DESCRIPTION OF THE DRAWINGS

This and other objects and features of this invention will become clear from the following description, taken in conjunction with the preferred embodiments with reference to the accompanied drawings in which:

FIGS. 3A to 3D are diagrams showing the aberrations observed in the first embodiment, at the telephoto end <L>;

FIGS. 7A to 7D are diagrams showing the aberrations observed in the second embodiment, at the telephoto end <L>;

FIG. 10 is a diagram showing the lens arrangement of a third embodiment of the invention;

FIGS. 11A to 11D are diagrams showing the aberrations observed in the third embodiment, at the telephoto end <L>;

FIGS. 13A to 13D are diagrams showing the aberrations observed in the third embodiment, at the wide-angle end <S>;

FIG. 18 is a diagram showing the lens arrangement of a fifth embodiment of the invention;

DESCRIPTION OF THE PREFERRED EMBODIMENTS

Figure 1:
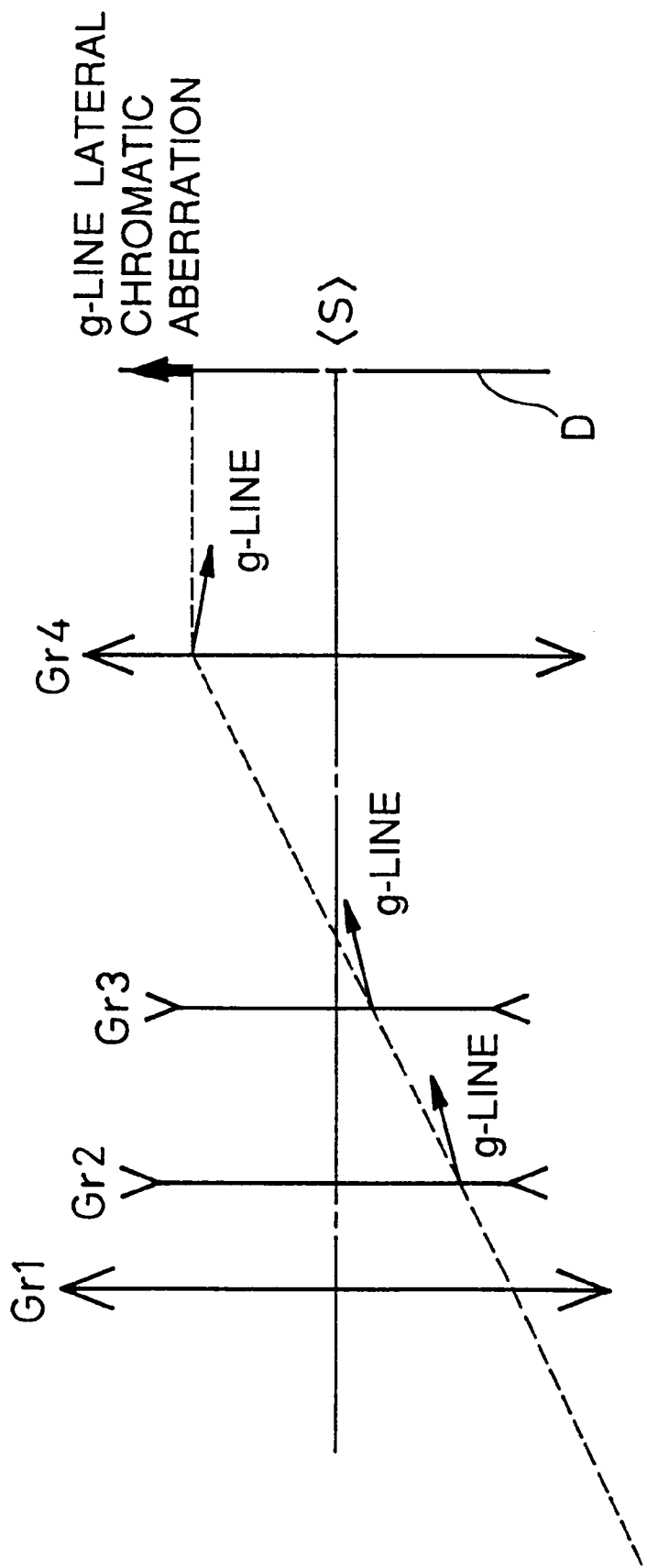
FIG. 1 is a diagram illustrating the principle of how lateral chromatic aberration is corrected in a variable magnification optical system of a positive-negative-negative-positive constitution.
Figure 2:
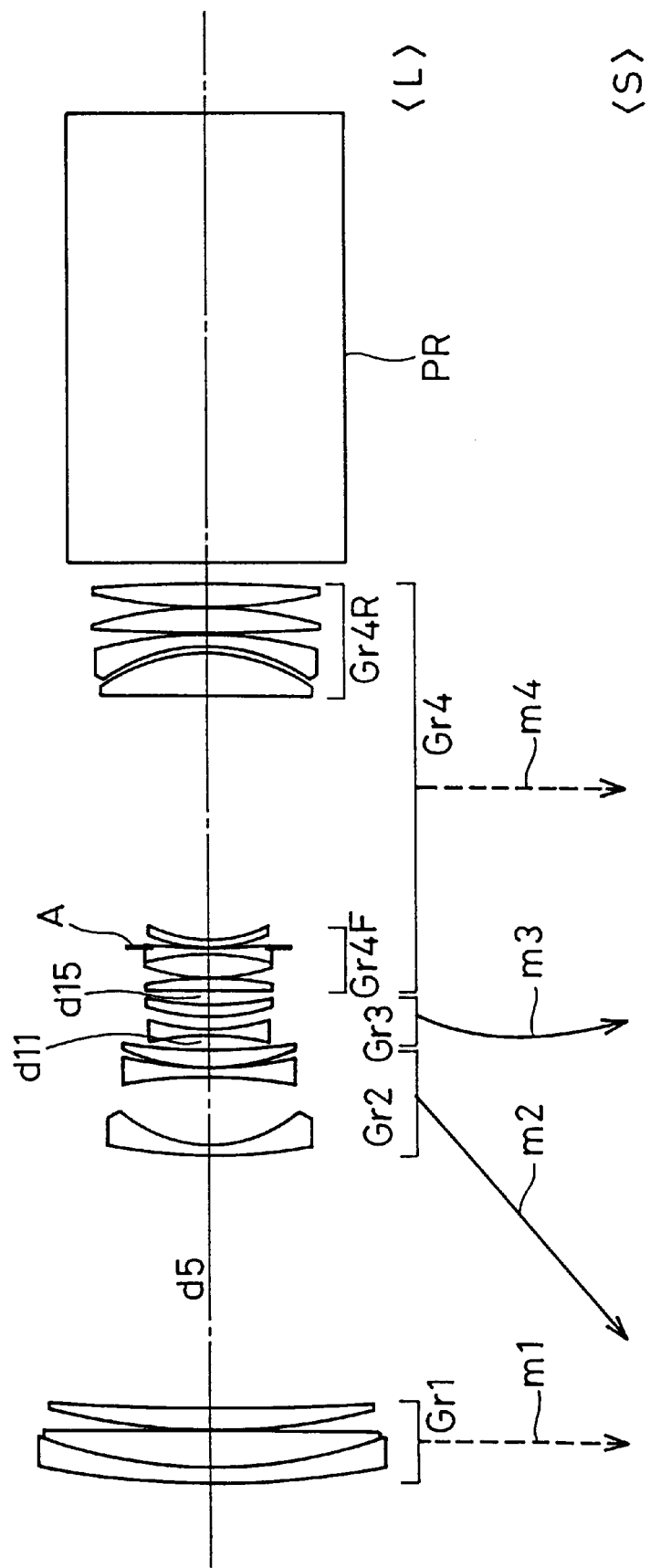
FIG. 2 is a diagram showing the lens arrangement of a first embodiment of the invention.
Figure 4A:
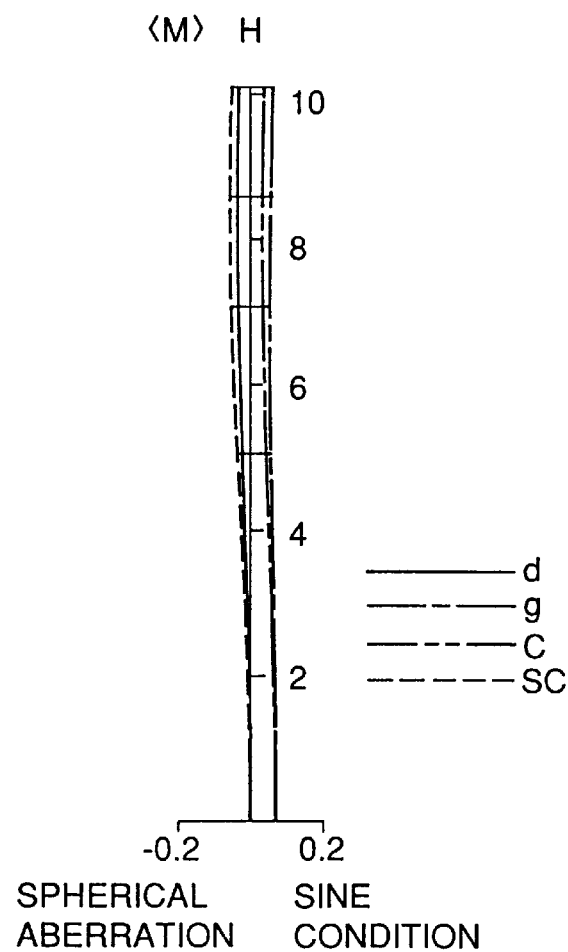
FIGS. 4A to 4D are diagrams showing the aberrations observed in the first embodiment, at the middle focal length <M>.
Figure 4B:
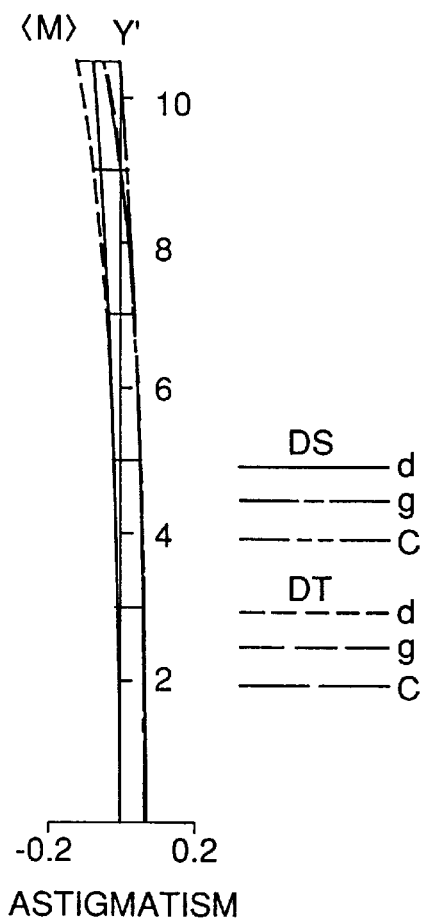
Figure 4C:
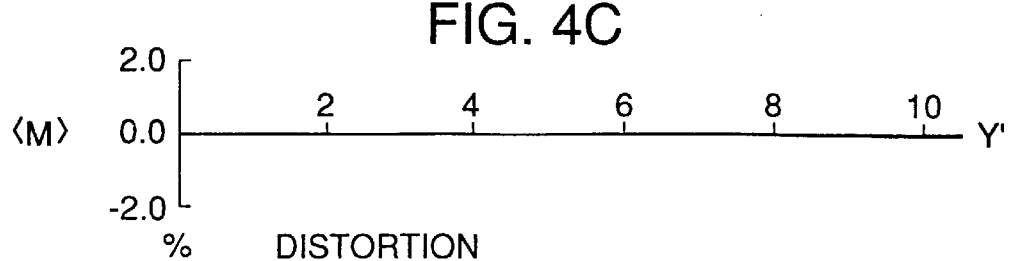
Figure 4D:
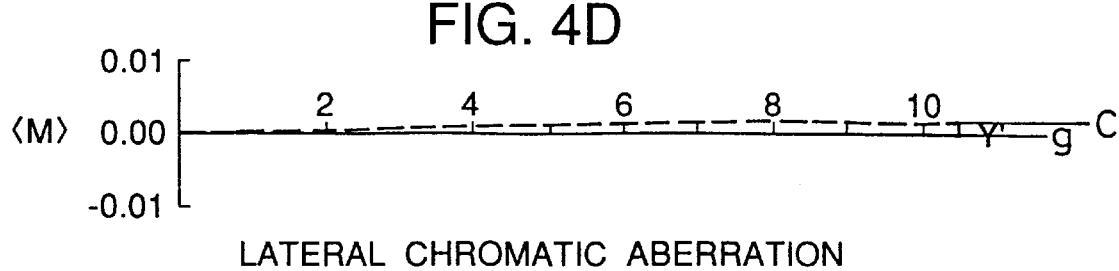
Figure 5A:
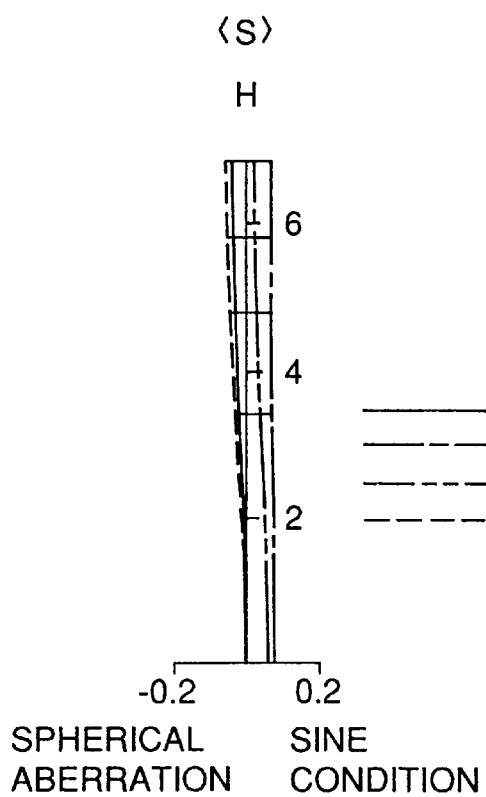
FIGS. 5A to 5D are diagrams showing the aberrations observed in the first embodiment, at the wide-angle end <S>.
Figure 5B:
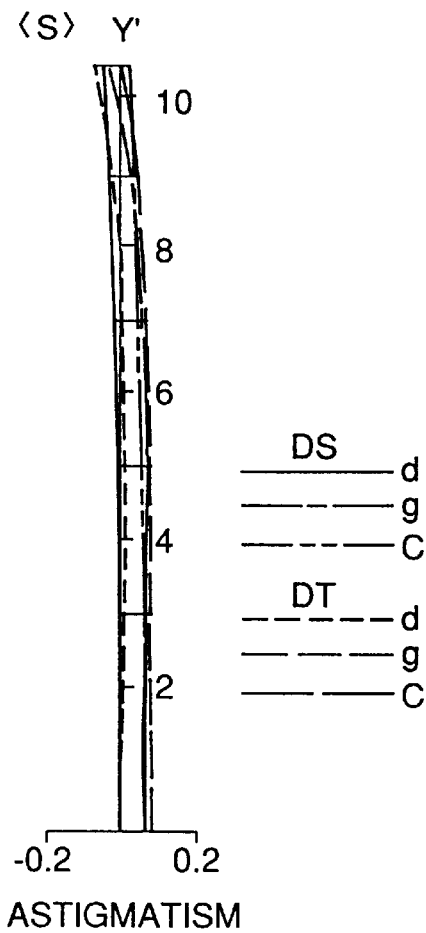
Figure 5C:
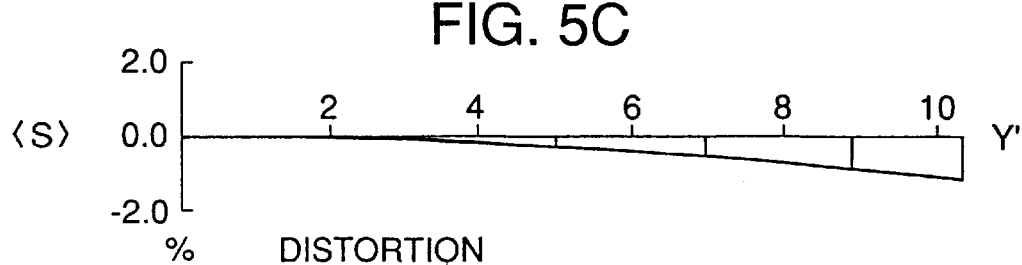
Figure 5D:
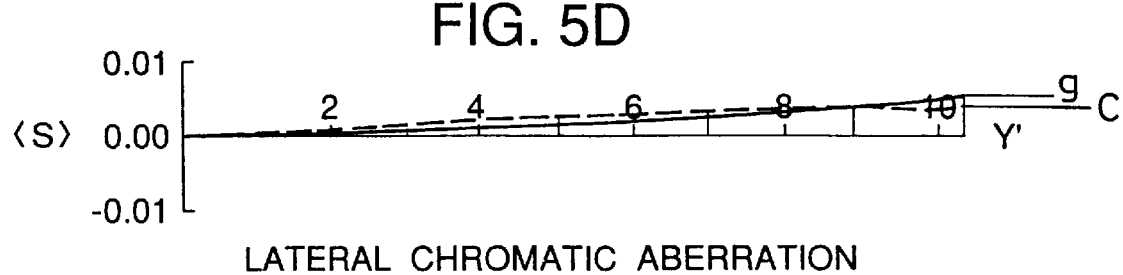
Figure 6:
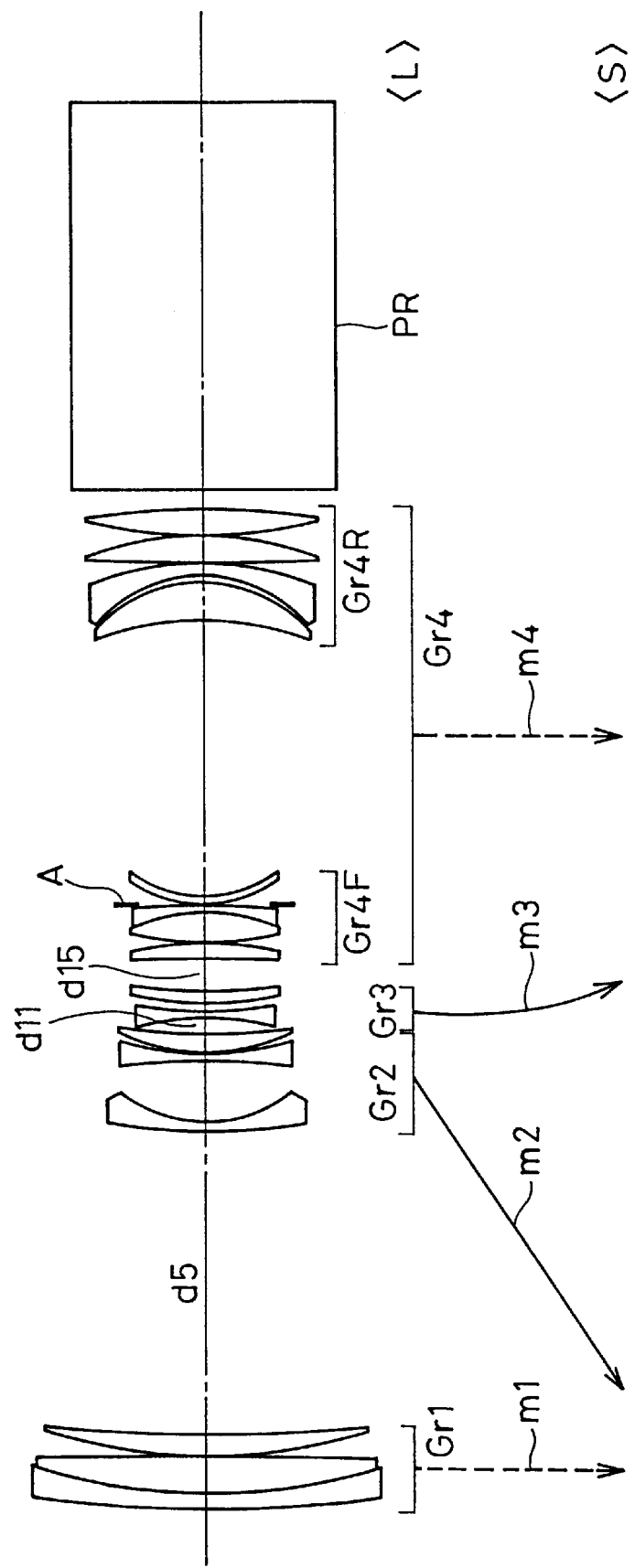
FIG. 6 is a diagram showing the lens arrangement of a second embodiment of the invention.
Figure 8A:
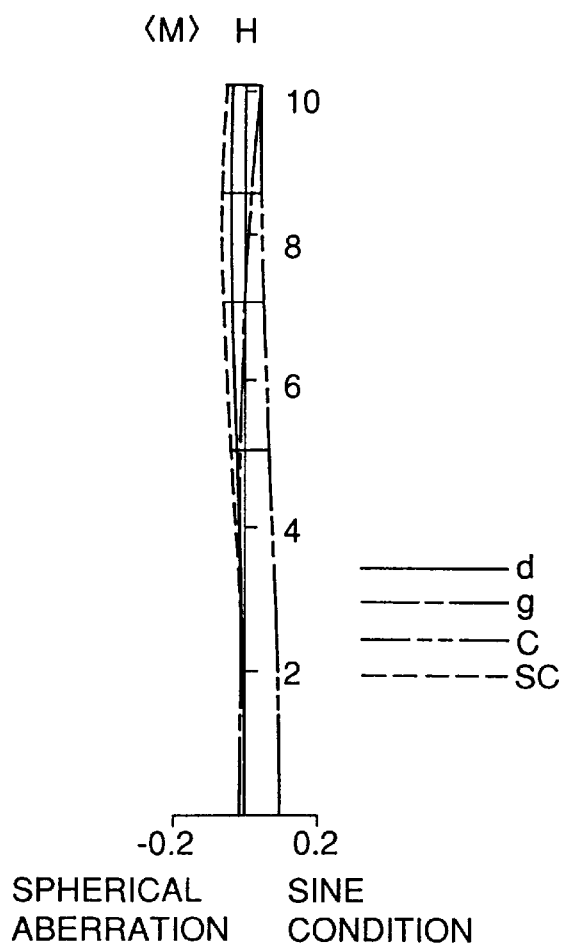
FIGS. 8A to 8D are diagrams showing the aberrations observed in the second embodiment, at the middle focal length <M>.
Figure 8B:
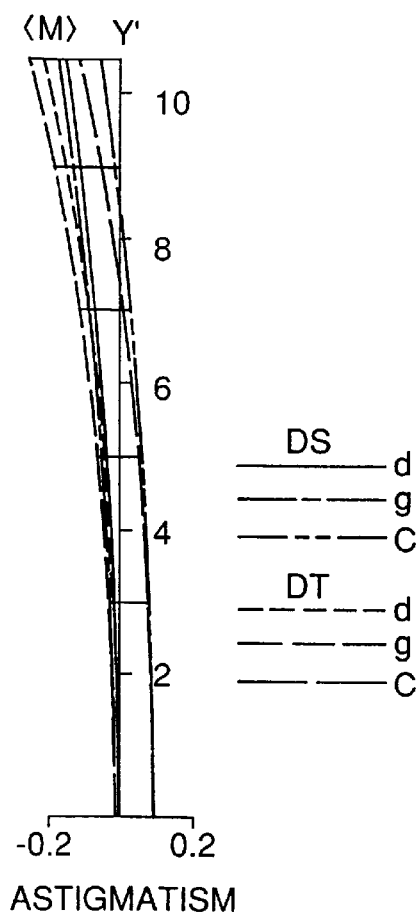
Figure 8C:
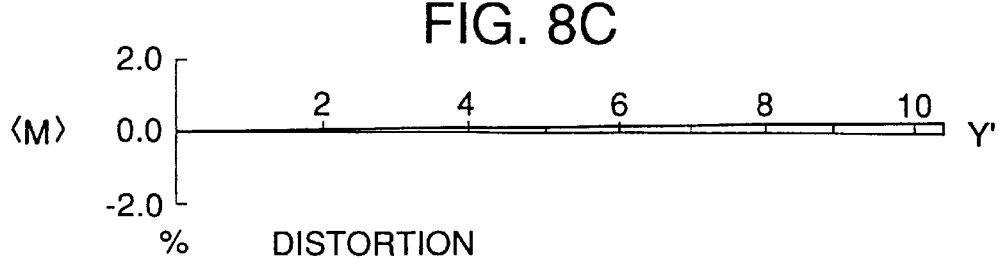
Figure 8D:
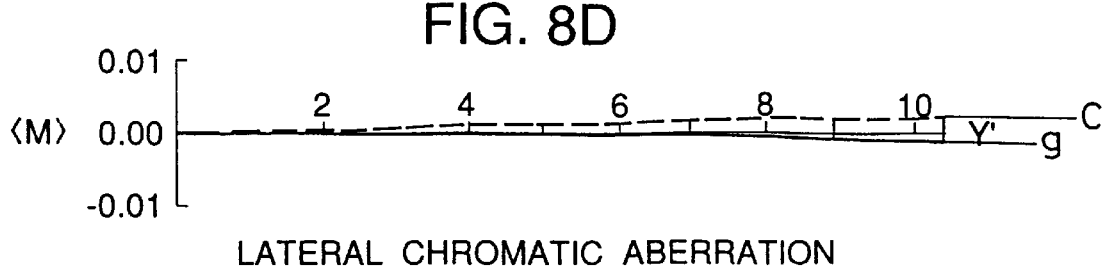
Figure 9A:
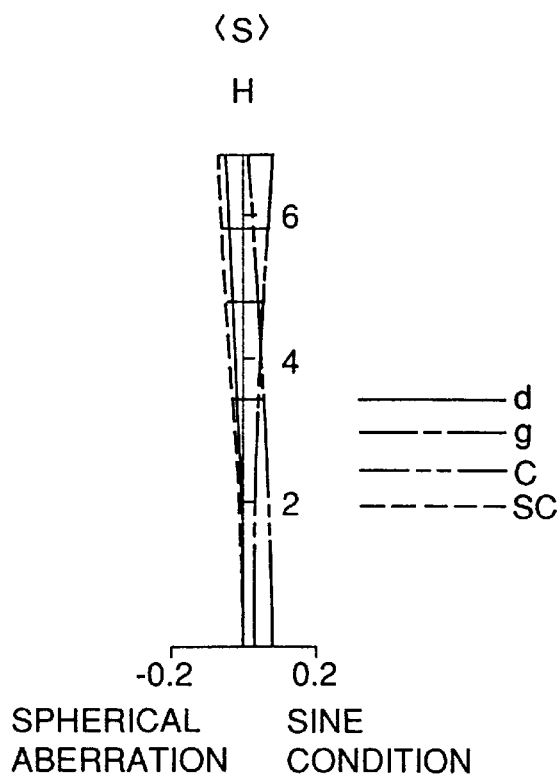
FIGS. 9A to 9D are diagrams showing the aberrations observed in the second embodiment, at the wide-angle end <S>.
Figure 9B:
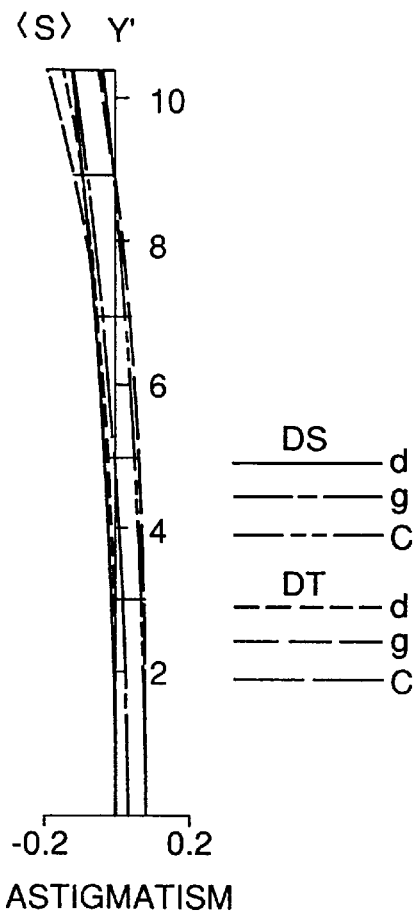
Figure 9C:
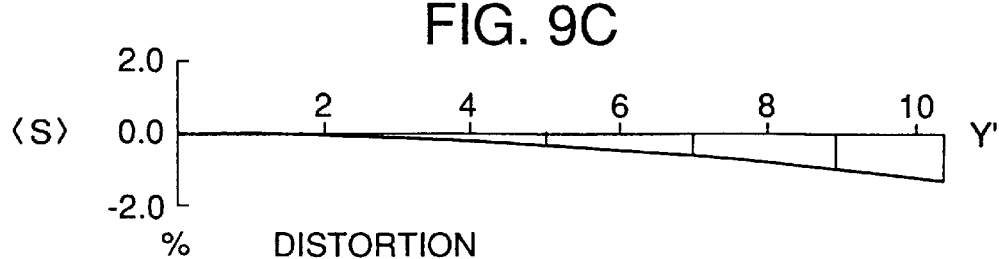
Figure 9D:
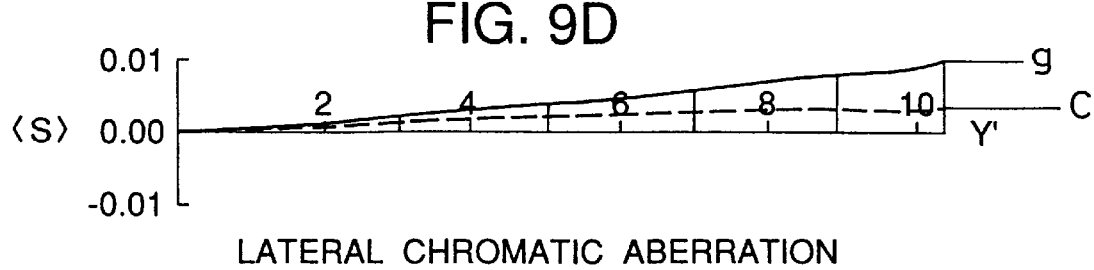
Figure 12A:
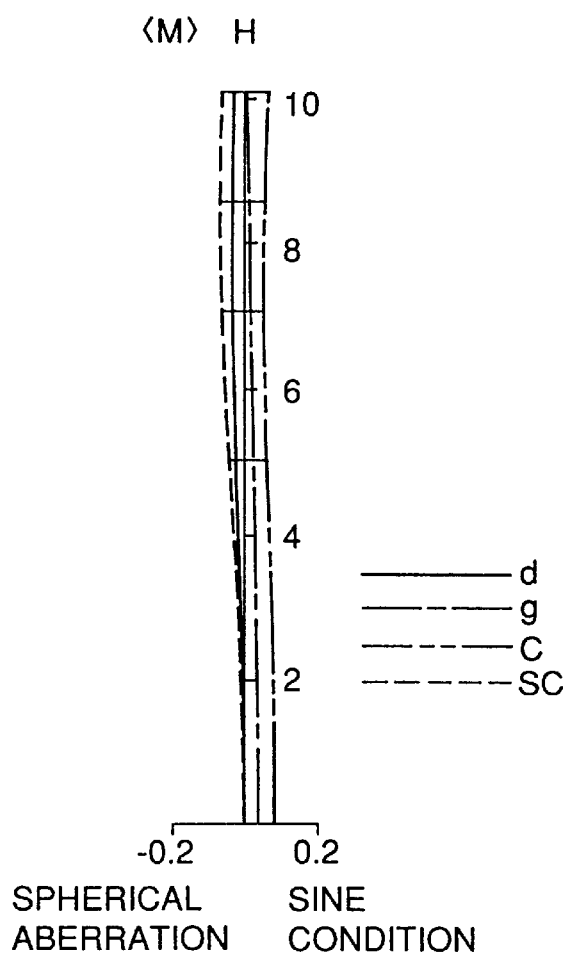
FIGS. 12A to 12D are diagrams showing the aberrations observed in the third embodiment, at the middle focal length <M>.
Figure 12B:
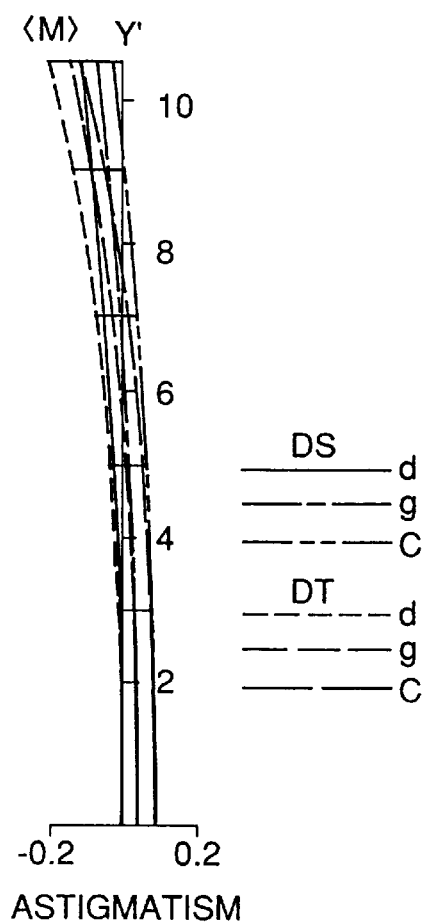
Figure 12C:
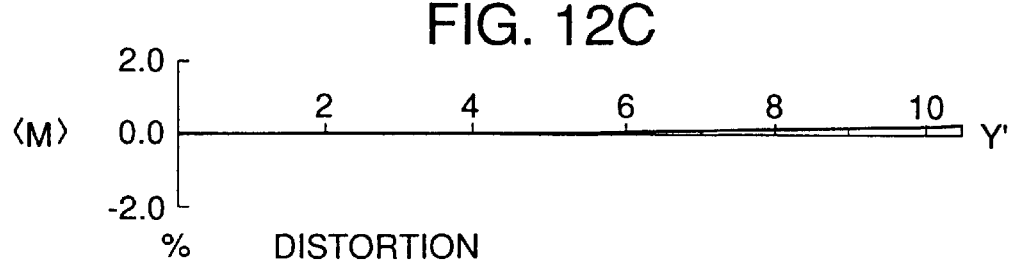
Figure 12D:
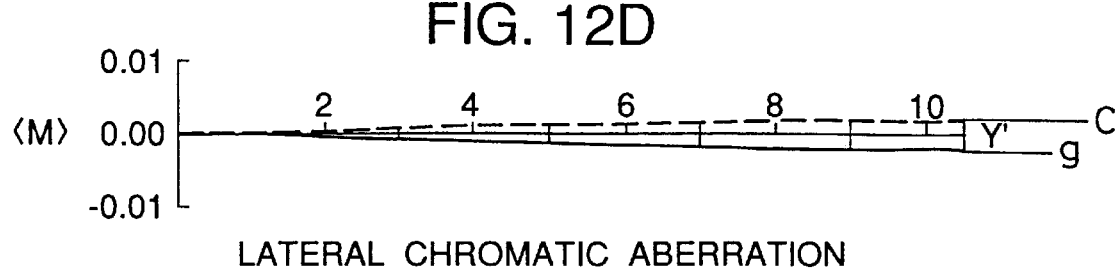
Figure 14:
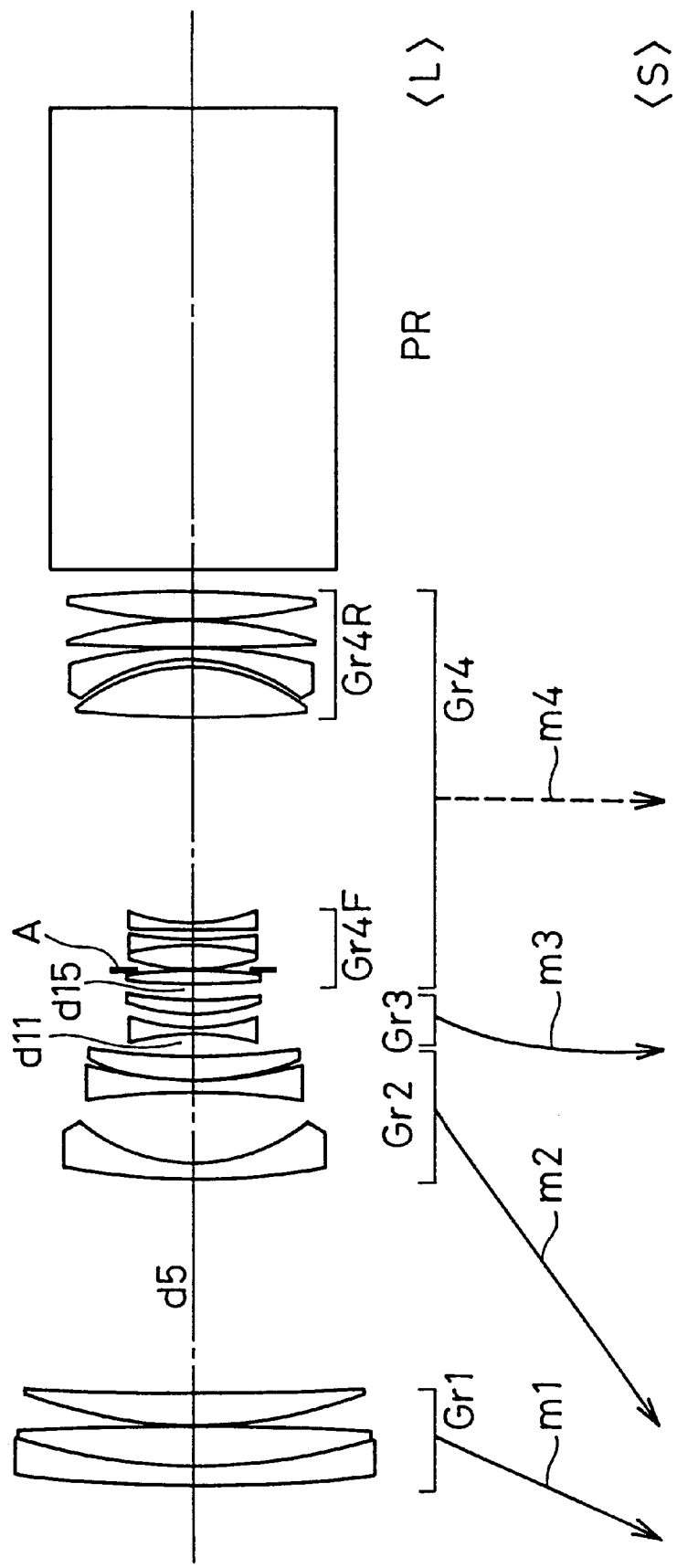
FIG. 14 is a diagram showing the lens arrangement of a fourth embodiment of the invention.
Figure 15A:
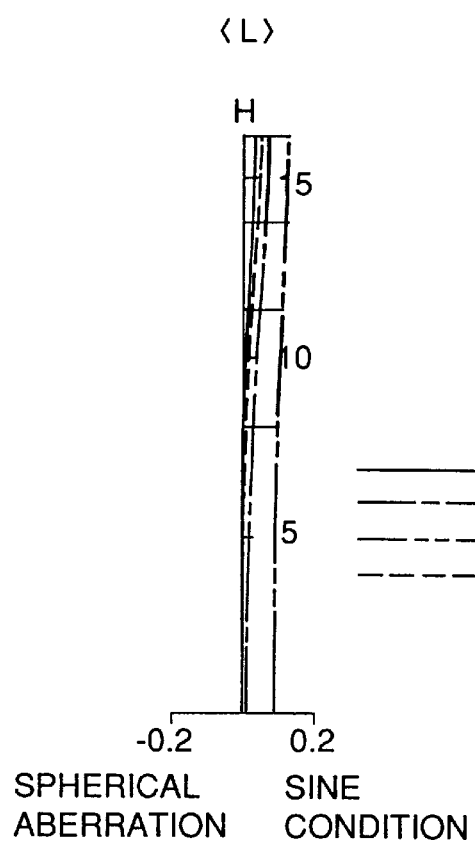
FIGS. 15A to 15D are diagrams showing the aberrations observed in the fourth embodiment, at the telephoto end <L>.
Figure 15B:
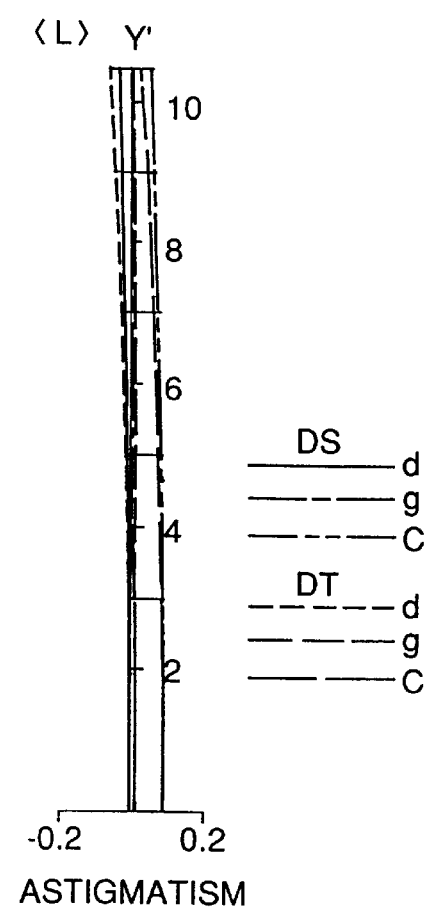
Figure 15C:
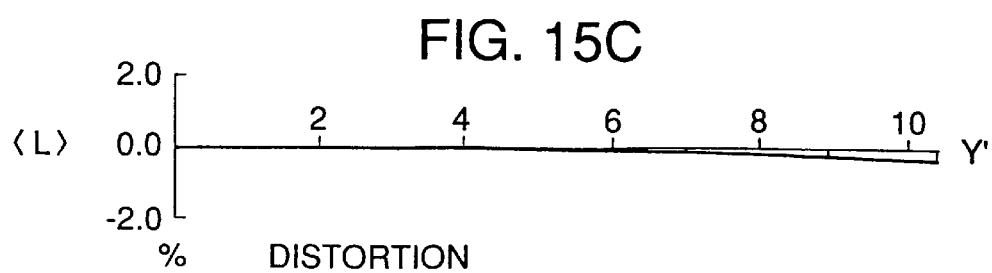
Figure 15D:
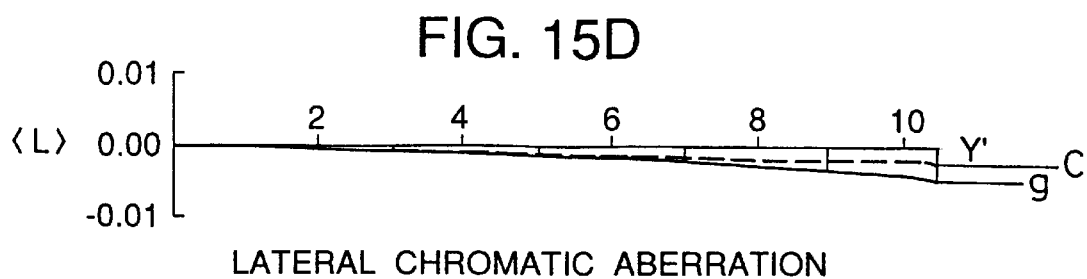
Figure 16A:
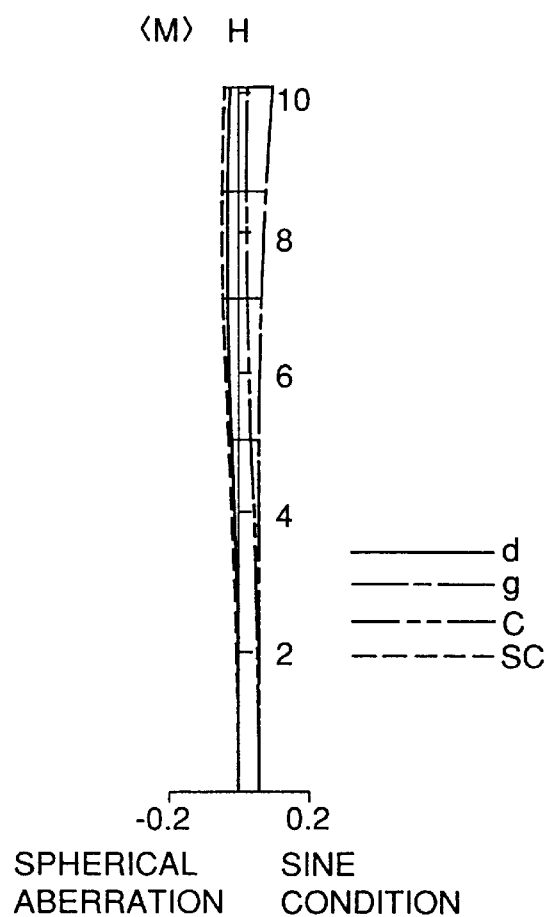
FIGS. 16A to 16D are diagrams showing the aberrations observed in the fourth embodiment, at the middle focal length <M>.
Figure 16B:
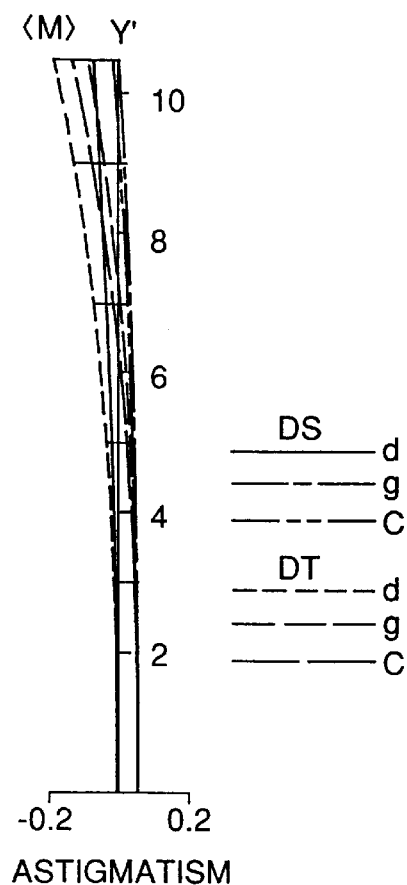
Figure 16C:
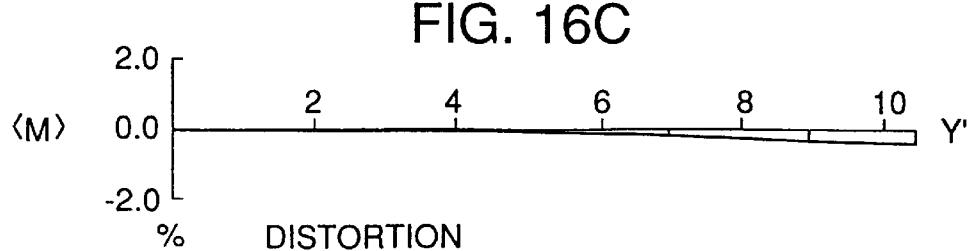
Figure 16D:
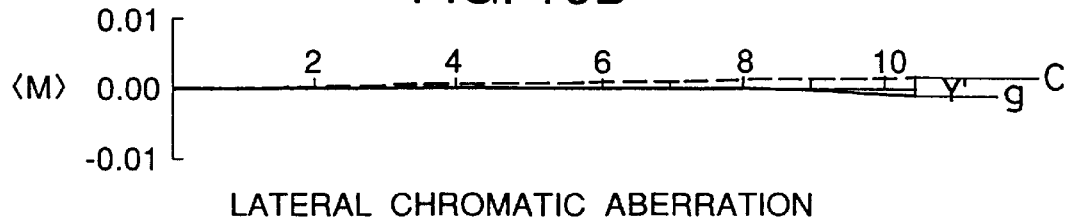
Figure 17A:
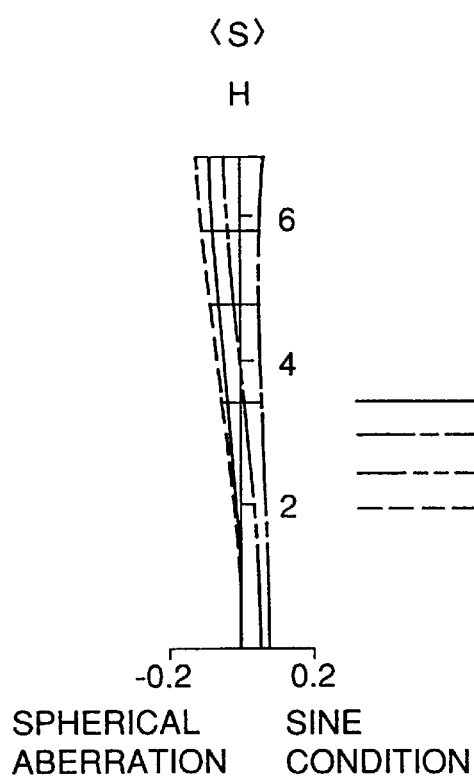
FIGS. 17A to 17D are diagrams showing the aberrations observed in the fourth embodiment, at the wide-angle end <S>.
Figure 17B:
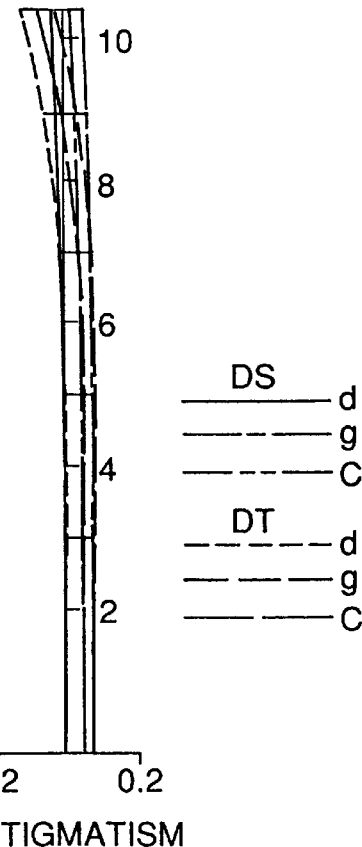
Figure 17C:
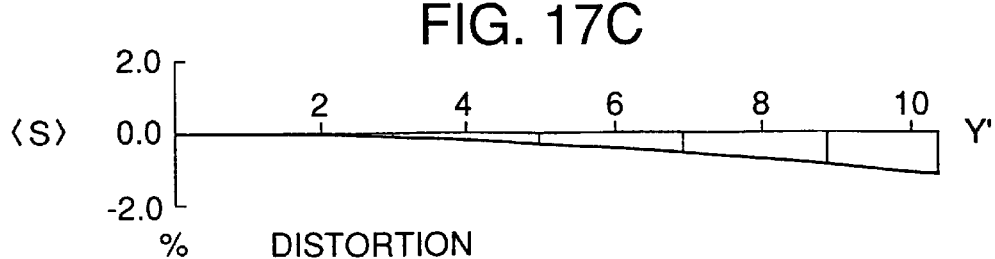
Figure 17D:
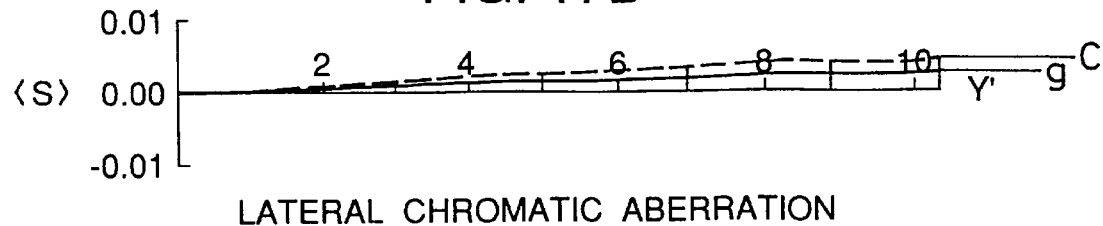
Figures 19A, 19B, 19C, 19D:
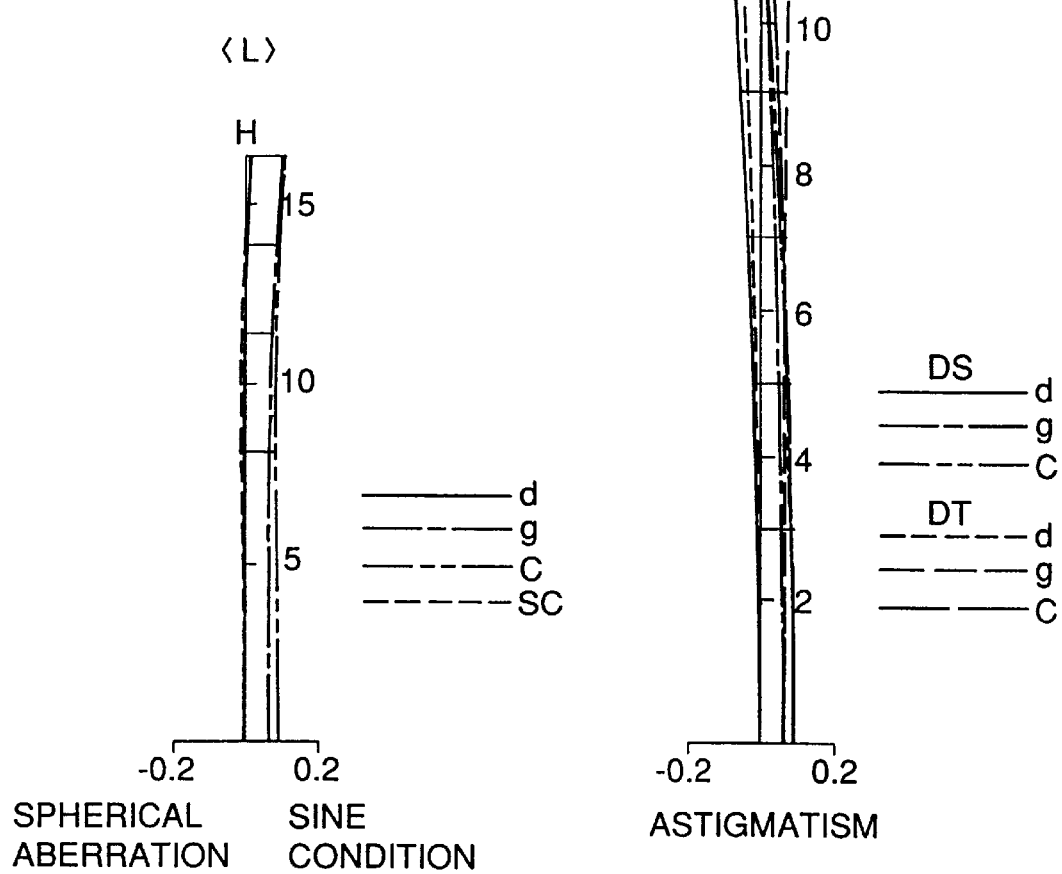
FIGS. 19A to 19D are diagrams showing the aberrations observed in the fifth embodiment, at the telephoto end <L>.
Figure 20A:
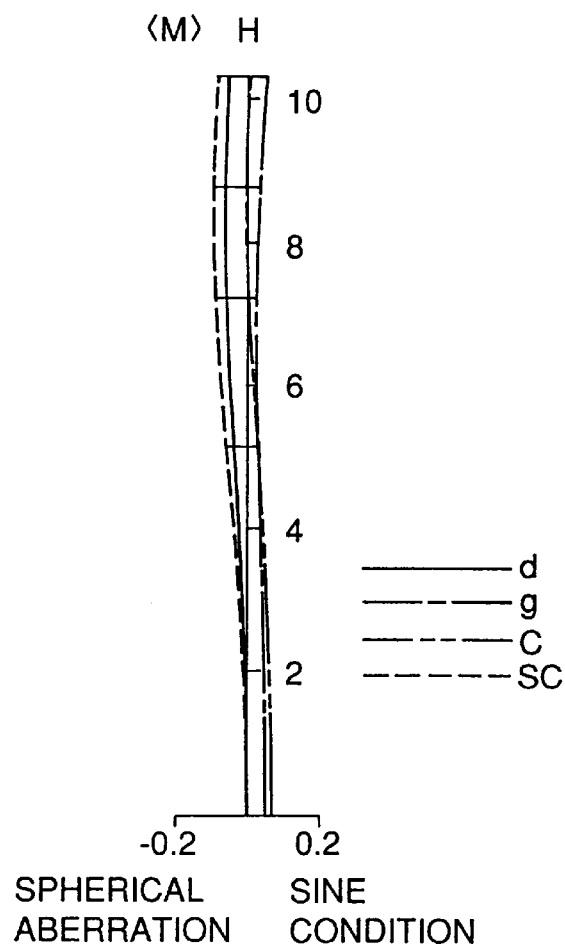
FIGS. 20A to 20D are diagrams showing the aberrations observed in the fifth embodiment, at the middle focal length <M>.
Figure 20B:
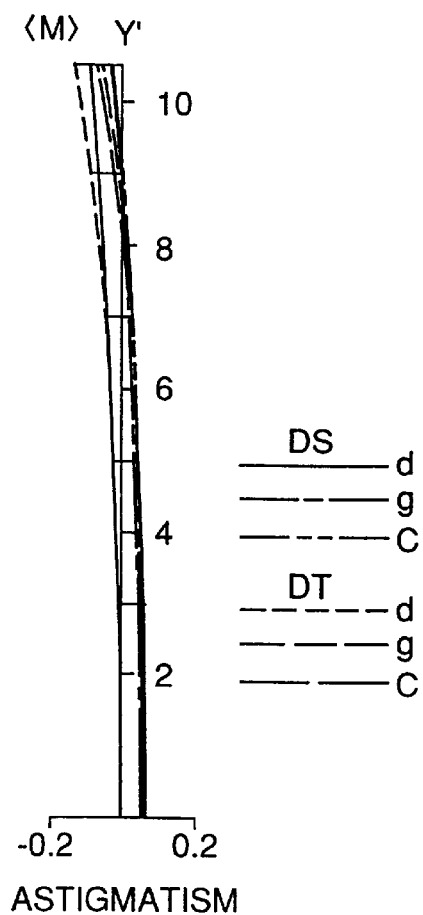
Figure 20C:
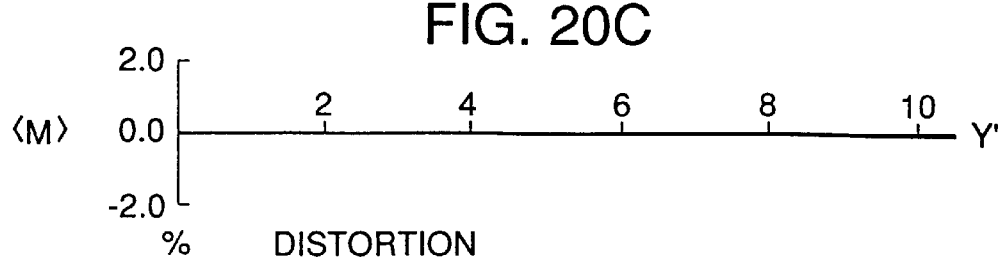
Figure 20D:
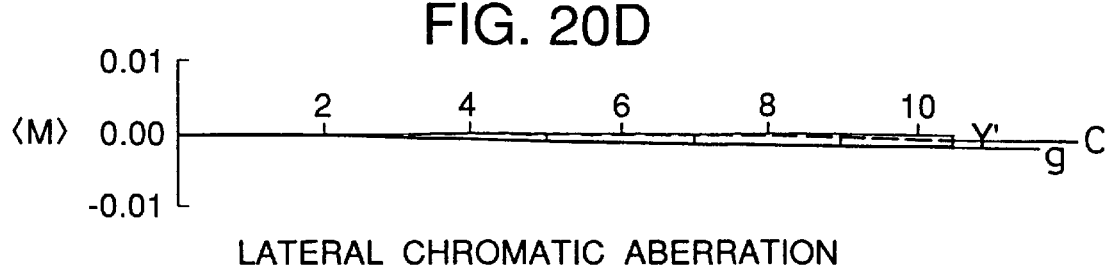
Figure 21A:
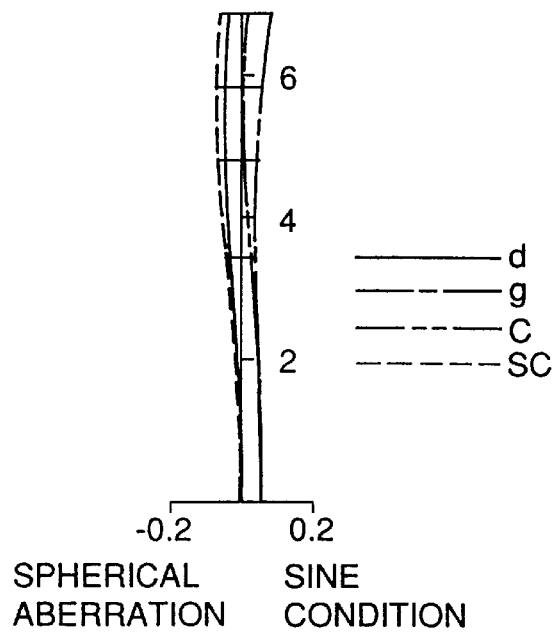
FIGS. 21A to 21D are diagrams showing the aberrations observed in the fifth embodiment, at the wide-angle end <S>.
Figure 21B:
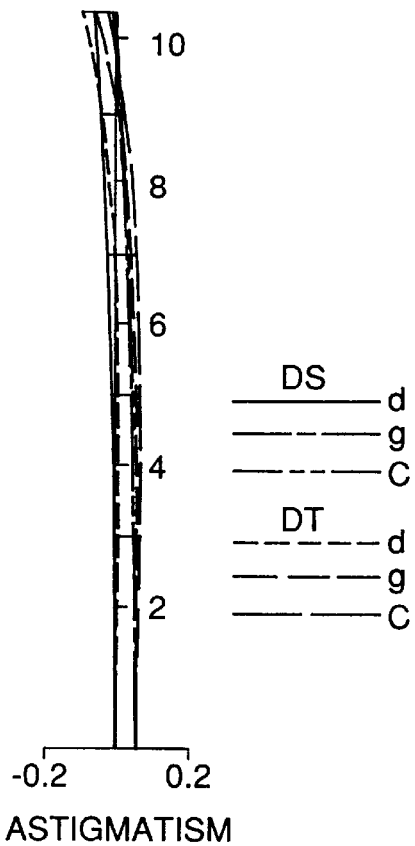
Figure 21C:
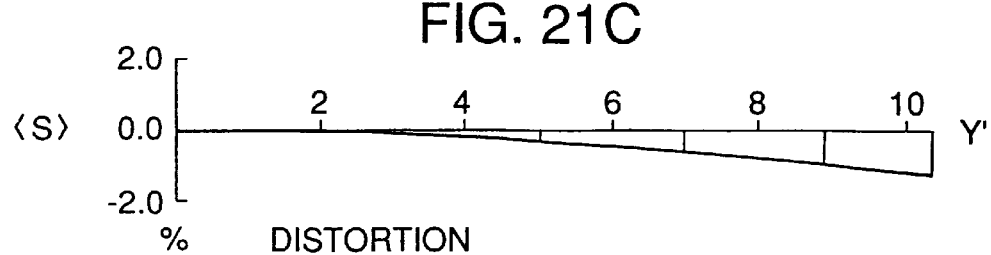
Figure 21D:
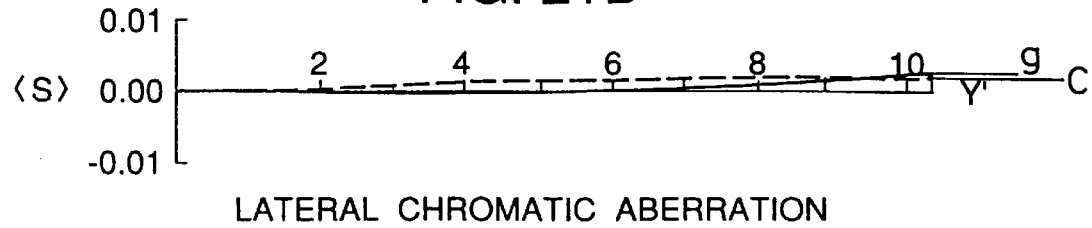

Hereinafter, variable magnification optical systems embodying the present invention will be described with reference to the drawings. Note that, although all of the embodiments described hereafter are designed as variable magnification optical systems that are suitably used as projection optical systems in projection apparatus (for example, liquid crystal projectors), they are suitably used also as image-sensing optical systems in image-sensing apparatus (for example, video cameras).

FIGS. 2, 6, 10, 14, and 18 show the lens arrangements, at the telephoto end <L>, of the first to fifth embodiments, respectively. In each of these lens arrangement diagrams, arrows m1 to m4 schematically indicate the movement of the first to fourth lens units Gr1 to Gr4, respectively, during zooming from the telephoto end (longest-focal-length end) <L> to the wide-angle end (shortest-focal-length end) <S>. Moreover, in each lens arrangement diagram, di (where i is a natural number) indicates that the i-th axial distance from the enlargement side (i.e. from the projection side) is a variable axial distance that varies with zooming.

In all of the first to fifth embodiments, the variable magnification optical system is constituted as a four-unit zoom lens system consisting of, from the enlargement (projection) side, a first lens unit Gr1 having a positive optical power, a second lens unit Gr2 having a negative optical power, a third lens unit Gr3 having a negative optical power, and that is a fourth lens unit Gr4 having a positive optical power and kept in a fixed position during zooming. In all of the first to fifth embodiments, zooming is performed by moving at least the second and third lens units Gr2 and Gr3 along the optical axis. In addition, in the fourth embodiment, the first lens unit Gr1 is moved along the optical axis toward the enlargement side during zooming from the telephoto end <L> to the wide-angle end <S>.

In all embodiments, the fourth lens unit Gr4 consists of, from the enlargement side, a front lens unit Gr4F having a positive optical power, and a rear lens unit Gr4R having a positive optical power and arranged at a certain distance from the front lens unit Gr4F. The first, second, and third lens units Gr1, Gr2, and Gr3 together with the front lens unit Gr4F of the fourth lens unit Gr4 are designed to constitute a substantially afocal system as a whole. Moreover, a dichroic prism PR is disposed on the reduction side of the fourth lens unit Gr4.

In the first embodiment, the first lens unit Gr1 is composed of, from the enlargement side, a doublet lens element formed by joining together a negative meniscus lens element concave to the reduction side and a plano-convex lens element convex to the enlargement side, and a positive meniscus lens element convex to the enlargement side. In the second to fifth embodiments, the first lens unit Gr1 is composed of, from the enlargement side, a doublet lens element formed by joining together a negative meniscus lens element concave to the reduction side and a positive biconvex lens element, and a positive meniscus lens element convex to the enlargement side. In the first to fifth embodiments, the second lens unit Gr2 is composed of, from the enlargement side, a negative meniscus lens element concave to the reduction side, a negative biconcave lens element, and a positive meniscus lens element convex to the enlargement side. In the first to fourth embodiments, the third lens unit Gr3 is composed of, from the enlargement side, a negative biconcave lens element, and a positive meniscus lens element convex to the enlargement side. In the fifth embodiment, the third lens unit Gr3 is composed of, from the enlargement side, a negative biconcave lens element, a positive meniscus lens element convex to the enlargement side, and an aperture stop A.

In the first embodiment, the front lens unit Gr4F of the fourth lens unit Gr4 is composed of, from the enlargement side, a positive biconvex lens element, a doublet lens element formed by joining together a positive biconvex lens element and a negative biconcave lens element, an aperture stop A, and a negative meniscus lens element concave to the reduction side. In the first embodiment, the rear lens unit Gr4R of the fourth lens unit Gr4 is composed of, from the enlargement side, a plano-convex lens element convex to the reduction side, a negative meniscus lens element concave to the enlargement side, and two positive biconvex lens elements.

In the second embodiment, the front lens unit Gr4F of the fourth lens unit Gr4 is composed of, from the enlargement side, a positive meniscus lens element convex to the reduction side, a doublet lens element formed by joining together a positive biconvex lens element and a negative meniscus lens element concave to the enlargement side, an aperture stop A, and a negative meniscus lens element concave to the reduction side. In the second embodiment, the rear lens unit Gr4R of the fourth lens unit Gr4 is composed of, from the enlargement side, a positive meniscus lens element convex to the reduction side, a negative meniscus lens element concave to the enlargement side, and two positive biconvex lens elements.

In the third embodiment, the front lens unit Gr4F of the fourth lens unit Gr4 is composed of, from the enlargement side, a positive biconvex lens element (having an aspherical surface as its reduction-side surface), an aperture stop A, a doublet lens element formed by joining together a positive biconvex lens element and a negative biconcave lens element, and a negative meniscus lens element concave to the reduction side. In the third embodiment, the rear lens unit Gr4R of the fourth lens unit Gr4 is composed of, from the enlargement side, a positive biconvex lens element, a negative meniscus lens element concave to the enlargement side, and two positive biconvex lens elements.

In the fourth embodiment, the front lens unit Gr4F of the fourth lens unit Gr4 is composed of, from the enlargement side, a positive biconvex lens element, an aperture stop A, a doublet lens element formed by joining together a positive biconvex lens element and a negative biconcave lens element, and a negative meniscus lens element concave to the reduction side. In the fourth embodiment, the rear lens unit Gr4R of the fourth lens unit Gr4 is composed of, from the enlargement side. a positive biconvex lens element, a negative meniscus lens element concave to the enlargement side, and two positive biconvex lens elements.

In the fifth embodiment, the front lens unit Gr4F of the fourth lens unit Gr4 is composed of, from the enlargement side, a positive biconvex lens element, a doublet lens element formed by joining together a positive biconvex lens element and a negative biconcave lens element, and a negative meniscus lens element concave to the reduction side. In the fifth embodiment, the rear lens unit Gr4R of the fourth lens unit Gr4 is composed of, from the enlargement side, a positive biconvex lens element, a negative meniscus lens element concave to the enlargement side, and two positive biconvex lens elements.

In a variable magnification optical system of a positive-negative-negative-positive constitution, like the first to fifth embodiments, it is preferable that at least one negative lens element in the second lens unit Gr2, at least one negative lens element in the third lens unit Gr3, and at least one positive lens element in the fourth lens unit Gr4 be made of a lens materials that satisfy conditions (1) and (2) below.

$$0.015 < \Theta - (0.644 - 0.00168 \cdot \nu d) < 0.06 \quad (1)$$

$$65 < \nu d < 100 \quad (2)$$

where $$\Theta = (ng - nF)/(nF - nC);$$

$$\nu d = (nd - 1)/(nF - nC);$$

ng represents the refractive index for g-line (whose wavelength is 435.84 nm);

nF represents the refractive index for F-line (whose wavelength is 486.13 nm):

nC represents the refractive index for C-line (whose wavelength is 656.28 nm); and nd represents the refractive index for d-line (whose wavelength is 587.56 nm).

Condition (1) quantitatively defines the anomalous partial dispersion of a lens material for g- and F-lines as a deviation from the reference line used to determine a partial dispersion. More specifically, in condition (1), $\Theta$ represents the ratio of the partial dispersions for g- and F-lines of a lens material used, and the expression in the parentheses represents the ratio of the partial dispersions as calculated for a reference glass having the same $\nu d$ (Abbe number). In other words, a lens material that satisfies condition (1) is generally called an anomalous-dispersion glass, and, if a lens material exhibits a deviation greater than 0.015 from the reference line, that material has a higher refractive index for g-line than the reference glass.

FIG. 1 schematically shows the lens arrangement of a variable magnification optical system of a positive-negative-negative-positive constitution, at its wide-angle end <S>. In FIG. 1, the broken line represents the path of an off-axial principal ray as observed at the wide-angle end <S>. In conventional variable magnification optical systems, when lateral chromatic aberration is corrected in such a way that g- and C-lines pass through the surface D of a display device at the same positions, those positions deviate considerably in directions away from the optical axis, from the positions at which d-line passes through the same surface. In FIG. 1, the thick arrow on the display device surface D indicates the resultant lateral chromatic aberration (and the direction thereof) for the g-line.

The lateral chromatic aberration for g-line as described above can be corrected in the following manner. If a negative lens element in the second lens unit Gr2 having a negative optical power, a negative lens element in the third lens unit Gr3 having a negative optical power, and a positive lens element in the fourth lens unit Gr4 having a positive optical power are made of anomalous-dispersion glasses, these lens elements respectively help the lens units Gr2 to Gr4 to refract the g-line more in the directions indicated by the thin arrows in FIG. 1. This results from the fact that anomalous-dispersion glasses have higher refractive indices for g-line than the reference glass. Consequently, if lateral chromatic aberration for g- and C-lines is corrected by using lens materials that satisfy condition (1), it is possible to reduce far more effectively than in conventional projection optical systems the lateral chromatic aberration for the g-line that causes the g-line to deviate away from the optical axis at the wide-angle end <S>.

Accordingly, if the lower limit of condition (1) is exceeded, the lens materials used in the lens units Gr2 to Gr4 have too low anomalous dispersions, with the result that it is impossible to reduce lateral chromatic aberration sufficiently. By contrast, if the upper limit of condition (1) is exceeded, the lens materials will have sufficiently high anomalous dispersions; however, in general, no lens material having such a high anomalous dispersion is known to exist, and, even if there exists one, its use would require considerable extra cost.

On the other hand, if the lower limit of condition (2) is exceeded, color-related aberrations cannot be corrected sufficiently within each lens unit, with the result that lateral chromatic aberration as well as longitudinal chromatic aberration vary greatly as the magnification is varied for adjustment. By contrast, if the upper limit of condition (2) is exceeded, color-related aberrations will be corrected sufficiently, but, in general, no such lens material is known to exist.

Moreover, in a variable magnification optical system of a positive-negative-negative-positive constitution, like the first to fifth embodiments, in which the fourth lens unit Gr4 consists of, from the projection side, a front lens unit Gr4F having a positive optical power and a rear lens unit Gr4R having a positive optical power and that are arranged at a certain distance from the front lens unit Gr4F and in which the first, second, and third lens units Gr1, Gr2, and Gr3 together with the front lens unit Gr4F of the fourth lens unit Gr4 constitute a substantially afocal system as a whole, it is preferable that conditions (3) to (5) below be satisfied.

$$-0.2 < fW \cdot \phi FT < 0.15 \quad (3)$$

$$0.5 < |\phi 2| \cdot fW < 0.8 \quad (4)$$

$$0.25 < \phi 1/|\phi 2| < 0.5 \quad (5)$$

where fW represents the focal length of the entire optical system at the wide-angle end <S>;

φFT represents the composite optical power of the lens composition comprising the first lens unit Gr1, the second lens unit Gr2, the third lens unit Gr3, and the front lens unit Gr4F of the fourth lens unit Gr4 at the telephoto end <L>;

φ1 represents the optical power of the first lens unit Gr1; and

φ2 represents the optical power of the second lens unit Gr2.

Condition (3) defines the range of the preferable optical power of the lens composition from the first lens unit Gr1 to the front lens unit Gr4F of the fourth lens unit Gr4. More specifically, condition (3) requires that the lens composition from the first lens unit Gr1 to the front lens unit Gr4F of the fourth lens unit Gr4 be an afocal system that has a substantially weak optical power relative to the focal length of the entire system at the wide-angle end <S>.

If the lower limit of condition (3) is exceeded, the lens composition from the first lens unit Gr1 to the front lens unit Gr4F of the fourth lens unit Gr4 has too much negative optical power to constitute an afocal system, with the result that the rear lens unit Gr4R of the fourth lens unit Gr4 has too strong an optical power relative thereto. Consequently, the entire optical system has an unduly long back focal distance, and is thus unduly large-sized. In addition, from the viewpoint of optical performance, the coma aberration occurring in the rear lens unit Gr4R of the fourth lens unit Gr4 increases, and the Petzval sum shifts in the negative direction, with the result that it is difficult to correct curvature of field sufficiently.

By contrast, if the upper limit of condition (3) is exceeded, the lens composition from the first lens unit Gr1 to the front lens unit Gr4F of the fourth lens unit Gr4 has too much positive optical power to constitute an afocal system, with the result that the rear lens unit Gr4R of the fourth lens unit Gr4 has too weak an optical power relative thereto. Consequently, it is difficult to secure a sufficient back focal distance by means of the rear lens unit Gr4R of the fourth lens unit Gr4 alone. In addition, from the viewpoint of optical performance, the Petzval sum shifts in the positive direction, with the result that it is difficult to correct curvature of field sufficiently.

Condition (4) defines the range of the preferable optical power of the second lens unit Gr2, which is responsible for the most part of the effect of magnification adjustment. If the optical power of the second lens unit Gr2 is so weak that the lower limit of condition (4) is exceeded, the second lens unit Gr2 needs to be moved for an unduly long distance for magnification adjustment, with the result that the entire optical system becomes unduly large-sized. In addition, this requires use of an anomalous-dispersion lens element having a larger diameter in the second lens unit Gr2, and thus increases the cost. By contrast, if the optical power of the second lens unit Gr2 is so strong that the upper limit of condition (4) is exceeded, the second lens unit Gr2 only needs to be moved for a short distance for magnification adjustment; however, this advantage is more than canceled out by the resulting increase in the aberration occurring in the second lens unit Gr2, with the result that it is difficult to reduce sufficiently the variation of spherical aberration or other as occurs during magnification adjustment.

Condition (5) defines the balance between the optical powers of the first and second lens units Gr1 and Gr2. To realize the desired compactness and high performance, it is essential that condition (5) be satisfied. If the lower limit of condition (5) is exceeded, the second lens unit Gr2 has a substantially stronger optical power than the first lens unit Gr1, with the result that the pattern of the movement of the third lens unit Gr3 during magnification adjustment changes in such a way that the third lens unit Gr3 is positioned closer to the display device surface D (i.e. farther to the reduction side) at the wide-angle end <S> than at the telephoto end <L>. Consequently, to prevent collision between the third lens unit Gr3 and the front lens unit Gr4F of the fourth lens unit GrF, the third lens unit Gr3 needs to be positioned further to the projection side (enlargement side) at the telephoto end <L>, and thus the entire optical system becomes unduly large-sized. By contrast, if the upper limit of condition (5) is exceeded, the second lens unit Gr2 has a substantially weaker optical power than the first lens unit Gr1, with the result that the pattern of the movement of the third lens unit Gr3 during magnification adjustment changes in such a way that the third lens unit Gr3 is positioned further to the projection side at the wide-angle end <S> than at the telephoto end <L>. This not only increases negative distortion at the wide-angle end <S>, but also makes it difficult to reduce sufficiently the variation of spherical aberration or other as occurs during magnification adjustment.

It is preferable, as in the first to fourth embodiments, to dispose an aperture stop A within the front lens unit Gr4F of the fourth lens unit Gr4 and substantially at the position of the front focal point of the rear lens unit Gr4R of the fourth lens unit Gr4. Such arrangement of an aperture stop A makes it possible to realize an optical system that is telecentric toward the reduction side. In an optical system that is telecentric toward the reduction side, the rays that pass through a cross dichroic prism disposed on the display device surface D side of the optical system enter the dichroic surface at uniform angles regardless of their heights on the display device surface D. This makes it possible to prevent unexpected color shades in images projected onto the screen surface. In addition, since the front lens unit Gr4F, in which the aperture stop A is disposed, of the fourth lens unit Gr4 is kept in a fixed position during magnification adjustment, it is possible to keep the reduction-side f-number constant during magnification adjustment. It should be noted that an "aperture stop" here refers not only to a variable-aperture aperture stop that can vary the diameter of the axial light beam, but also to a light-beam restricting plate, as formed together with a lens holder, that serves as a fixed-aperture aperture stop to restrict the axial light beam.

Alternatively, it is preferable, as in the fifth embodiment, to dispose an aperture stop A within the third lens unit Gr3 and substantially at the position of the front focal point of the fourth lens unit Gr4. Such arrangement of an aperture stop A makes it possible to realize an optical system that is substantially telecentric toward the reduction side, just as described above in connection with the first to fourth embodiments. In an optical system that has an aperture stop A so arranged, the degree to which the optical system is telecentric varies slightly as the third lens unit Gr3 is moved for magnification adjustment, and thus there is a possibility of unexpected color shades appearing, though only to a slight extent, in projected images. However, this disadvantage is more than canceled out by the advantage that the aperture stop A can be disposed closer to the first and second lens units Gr1 and Gr2 and thus the diameters of the lens elements constituting these lens units can be reduced. As a result, this arrangement makes it possible to realize a compact variable magnification optical system at low cost.

If, as in the third embodiment, an aspherical surface is used in a variable magnification optical system of a positive-negative-negative-positive constitution, it is possible to correct various kinds of aberration effectively. More specifically, by additionally providing an aspherical surface close to the aperture stop A, it is possible to effectively correct, in particular, spherical aberration. Moreover, if, as in the fourth embodiment, a variable magnification optical system of a positive-negative-negative-positive constitution is designated so that the first lens unit Gr1 is moved toward the projection side during magnification adjustment from the telephoto end <L> to the wide-angle end <S>, it is possible to effectively correct, in particular, negative distortion at the wide-angle end <S>. In a variable magnification optical system of a positive-negative-negative-positive constitution, it is preferable to achieve focusing by moving one of the constituent lens units other than the second lens unit Gr2, or all of the first to fourth lens units Gr1 to Gr4 together, along the optical axis. This focusing method makes it possible to perform focusing without significant variation in the magnification.

Tables 1 to 5 respectively list the construction data of examples of the variable magnification optical systems of the first to fifth embodiments, to which the lens arrangement diagrams FIGS. 2, 6, 10, 14, and 18 respectively correspond.

In the construction data of each example, ri (i=1, 2, 3, ...) represents the radius of curvature of the i-th surface from the enlargement side, di (i=1, 2, 3, ...) represents the i-th axial distance from the enlargement side, and Ni (i=1, 2, 3, ...) and vi (i=1, 2, 3, ...) respectively represent the refractive index (nd) and the Abbe number (vd), for d-line, of the i-th optical element from the enlargement side. In the construction data, for each of such axial distances that vary with zooming (variable axial distances), three values are listed that represent, from the left, the axial distances between the corresponding lens units at the telephoto end (in the longest-focal-length state) <L>, at the middle focal length (in the middle-focal-length state) <M>, and at the wide-angle end (in the shortest-focal-length state) <S>. Also listed in the construction data are the focal lengths f, the f-numbers FNO, and the back focal distances S' of the entire system (i.e. the entire optical system including the dichroic prism PR) in those three focal-length states.

In the construction data of each example, a surface whose radius of curvature ri is marked with an asterisk (*) is an aspherical surface, whose surface shape is defined by formula (AS) below.

$$X = \frac{C \cdot Y^2}{1 + (1 - \epsilon \cdot Y^2 \cdot C^2)^{1/2}} + \sum_i A_i Y^i \quad (AS)$$

where

X represents the displacement from the reference surface in the optical axis direction;

Y represents the height in a direction perpendicular to the optical axis;

C represents the paraxial curvature;

$\epsilon$ represents the quadric surface parameter; and

Ai represents the aspherical coefficient of i-th order.

Table 6 lists the values corresponding to conditions (1) to (5) together with the values related thereto as observed in each example.

FIGS. 3A–3D, 4A–4D, 5A–5D, 7A–7D, 8A–8D, 9A–9D, 11A–11D, 12A–12D, 13A–13D, 15A–15D, 16A–16D, 17A–17D, 19A–19D, 20A–20D, and 21A–21D show various kinds of aberration (expressed as heights of incidence H or image heights Y') appearing when an object at an infinite distance on the reduction side is observed through the optical systems (each including a dichroic prism PR) of the first (FIGS. 3A–3D, 4A–4D, and 5A–5D), second (FIGS. 7A–7D, 8A–8D, and 9A–9D), third (FIGS. 11A–11D, 12A–12D, and 13A–13D), fourth (FIGS. 15A–15D, 16A–16D, and 17A–17D), and fifth (FIGS. 19A–19D, 20A–20D, and 21A–21D) embodiments at the telephoto end <L> (FIGS. 3A–3D, 7A–7D, 11A–11D, 15A–15D, and 19A–9D), at the middle focal length <M> (FIGS. 4A–4D, 8A–8D, 12A–12D, 16A–16D, and 20A–20D), and at the wide-angle end <S> (FIGS. 5A–5D, 9A–9D, 13A–13D, 17A–17D, and 21A–21D). Of these aberration diagrams, FIGS. 3A, 4A, 5A, 7A, 8A, 9A, 11A, 12A, 13A, 15A, 16A, 17A, 19A, 20A, and 21A show the spherical aberration for d-, g-, and C-lines as well as the sine condition (SC); FIGS. 3B, 4B, 5B, 7B, 8B, 9B, 11B, 12B, 13B, 15B, 16B, 17B, 19B, 20B, and 21B show the as d-, g-, and C-lines on the sagittal plane (DS) and on the tangential plane (DT): FIGS. 3C, 4C, 5C, 7C, 8C, 9C, 11C, 12C, 13C, 15C, 16C, 17C, 19C, 20C, and 21C show the distortion for d-line; and FIGS. 3D, 4D, 5D, 7D, 8D, 9D, 11D, 12D, 13D, 15D, 16D, 17D 19D, 20D, and 21D show the lateral chromatic aberration for g- and C-lines. Note that, in practical use as a variable magnification projection optical system in a projection apparatus (such as a liquid crystal projector), the variable magnification optical systems of the embodiments have the image plane on the screen and have the object plane on the surface D of a display device (such as a liquid crystal panel), but that, in the above evaluation of the variable magnification optical systems of the embodiments, they are regarded as reduction systems (for example, taking optical systems) having the object plane on the screen, and their optical performance is evaluated on the display device surface D.

As described heretofore, according to one aspect of the present invention, it is possible to realize a variable magnification optical system that causes minimal lateral chromatic aberration and that can thus be used suitably to project images obtained from a small-sized, high-resolution display device. According to another aspect of the present invention, it is possible to realize a variable magnification optical system that provides a sufficient back focal distance and corrects various kinds of aberration sufficiently and that can thus be used suitably as a projection optical system. According to still another aspect of the present invention, it is possible to realize a variable magnification optical system that, by being designed to be telecentric toward the reduction side, produces projected images without unexpected color shades.

TABLE 1

<< Embodiment 1 >>
f = 97.0~60.5~41.0
FNO = 3.00~3.00~3.00
S' = 8.710~8.710~8.710

| Radius of Curvature | Axial Distance | Refractive Index | Abbe Number |
|---|---|---|---|
| {First Lens Unit Gr1 . . . Positive} | | | |
| r1 = 192.507 | | | |
|  | d1 = 4.000 | N1 = 1.80518 | ν1 = 25.46 |
| r2 = 104.880 | | | |
|  | d2 = 8.800 | N2 = 1.62041 | ν2 = 60.34 |
| r3 = ∞ | | | |
|  | d3 = 0.300 | | |
| r4 = 144.329 | | | |
|  | d4 = 5.000 | N3 = 1.62041 | ν3 = 60.34 |
| r5 = 519.745 | | | |
|  | d5 = 59.683~30.111~0.836 | | |
| {Second Lens Unit Gr2 . . . Negative} | | | |
| r6 = 131.972 | | | |
|  | d6 = 2.500 | N4 = 1.49700 | ν4 = 81.61 |
| r7 = 30.724 | | | |
|  | d7 = 15.500 | | |
| r8 = −107.557 | | | |
|  | d8 = 2.000 | N5 = 1.49700 | ν5 = 81.61 |
| r9 = 73.888 | | | |
|  | d9 = 0.300 | | |
| r10 = 48.844 | | | |
|  | d10 = 4.000 | N6 = 1.74950 | ν6 = 35.04 |
| r11 = 117.827 | | | |
|  | d11 = 3.354~31.685~62.203 | | |

TABLE 1-continued

<< Embodiment 1 >>
f = 97.0~60.5~41.0
FNO = 3.00~3.00~3.00
S' = 8.710~8.710~8.710

| Radius of Curvature | Axial Distance | Refractive Index | Abbe Number |
|---|---|---|---|
| {Third Lens Unit Gr3 . . . Negative} | | | |
| r12 = −64.548 | | | |
|  | d12 = 1.500 | N7 = 1.49700 | ν7 = 81.61 |
| r13 = 43.004 | | | |
|  | d13 = 3.000 | | |
| r14 = 45.905 | | | |
|  | d14 = 3.000 | N8 = 1.74950 | ν8 = 35.04 |
| r15 = 75.913 | | | |
|  | d15 = 2.975~4.216~2.974 | | |
| {Fourth Lens Unit Gr4 . . . Positive} | | | |
| (Front Lens Unit Gr4F . . . Positive) | | | |
| r16 = 440.857 | | | |
|  | d16 = 3.000 | N9 = 1.69680 | ν9 = 55.46 |
| r17 = −84.366 | | | |
|  | d17 = 0.300 | | |
| r18 = 44.843 | | | |
|  | d18 = 5.200 | N10 = 1.62041 | ν10 = 60.34 |
| r19 = −60.544 | | | |
|  | d19 = 1.500 | N11 = 1.70154 | ν11 = 41.15 |
| r20 = 93.897 | | | |
|  | d20 = 0.300 | | |
| r21 = ∞ (Aperture Stop A) | | | |
|  | d21 = 0.000 | | |
| r22 = 36.102 | | | |
|  | d22 = 1.700 | N12 = 1.49700 | ν12 = 81.61 |
| r23 = 29.323 | | | |
|  | d23 = 58.000 | | |
| (Rear Lens Unit Gr4R . . . Positive) | | | |
| r24 = ∞ | | | |
|  | d24 = 10.300 | N13 = 1.49700 | ν13 = 81.61 |
| r25 = −39.366 | | | |
|  | d25 = 1.500 | | |
| r26 = −38.888 | | | |
|  | d26 = 2.800 | N14 = 1.74950 | ν14 = 35.04 |
| r27 = −90.715 | | | |
|  | d27 = 0.300 | | |
| r28 = 457.641 | | | |
|  | d28 = 6.000 | N15 = 1.49700 | ν15 = 81.61 |
| r29 = −92.979 | | | |
|  | d29 = 0.300 | | |
| r30 = 115.076 | | | |
|  | d30 = 5.500 | N16 = 1.49700 | ν16 = 81.61 |
| r31 = −344.730 | | | |
|  | d31 = 5.000 | | |
| {Dichroic Prism PR} | | | |
| r32 = ∞ | | | |
|  | d32 = 105.500 | N17 = 1.51680 | ν17 = 64.20 |
| r33 = ∞ | | | |

TABLE 2

<< Embodiment >>
f = 97.0~60.5~41.0
FNO = 3.00~3.00~3.00
S' = 7.931~7.931~7.931

| Radius of Curvature | Axial Distance | Refractive Index | Abbe Number |
|---|---|---|---|
| {First Lens Unit Gr1 . . . Positive} | | | |
| r1 = 304.404 | | | |
|  | d1 = 4.000 | N1 = 1.80518 | ν1 = 25.46 |
| r2 = 140.694 | | | |
|  | d2 = 8.800 | N2 = 1.62041 | ν2 = 60.34 |

TABLE 2-continued

<< Embodiment >>
f = 97.0~60.5~41.0
FNO = 3.00~3.00~3.00
S' = 7.931~7.931~7.931

| Radius of Curvature | Axial Distance | Refractive Index | Abbe Number |
|---|---|---|---|
| r3 = −3431.591 | | | |
| | d3 = 0.300 | | |
| r4 = 132.133 | | | |
| | d4 = 5.000 | N3 = 1.62041 | ν3 = 60.34 |
| r5 = 321.056 | | | |
| | d5 = 74.712~37.742~1.000 | | |
| {Second Lens Unit Gr2 . . . Negative} | | | |
| r6 = 140.030 | | | |
| | d6 = 2.500 | N4 = 1.58170 | ν4 = 69.75 |
| r7 = 32.322 | | | |
| | d7 = 15.000 | | |
| r8 = −149.160 | | | |
| | d8 = 2.000 | N5 = 1.58170 | ν5 = 69.75 |
| r9 = 70.205 | | | |
| | d9 = 0.300 | | |
| r10 = 50.317 | | | |
| | d10 = 4.500 | N6 = 1.77551 | ν6 = 37.90 |
| r11 = 175.619 | | | |
| | d11 = 4.000~43.688~83.377 | | |
| {Third Lens Unit Gr3 . . . Negative} | | | |
| r12 = −59.927 | | | |
| | d12 = 1.500 | N7 = 1.58170 | ν7 = 69.75 |
| r13 = 88.403 | | | |
| | d13 = 2.000 | | |
| r14 = 74.010 | | | |
| | d14 = 3.000 | N8 = 1.74950 | ν8 = 35.04 |
| r15 = 117.591 | | | |
| | d15 = 8.000~5.281~2.335 | | |
| {Fourth Lens Unit Gr4 . . . Positive} | | | |
| (Front Lens Unit Gr4F . . . Positive) | | | |
| r16 = −530.287 | | | |
| | d16 = 4.000 | N9 = 1.69680 | ν9 = 55.46 |
| r17 = −76.330 | | | |
| | d17 = 0.300 | | |
| r18 = 86.227 | | | |
| | d18 = 7.500 | N10 = 1.62041 | ν10 = 60.34 |
| r19 = −41.334 | | | |
| | d19 = 1.500 | N11 = 1.70154 | ν11 = 41.15 |
| r20 = −149.495 | | | |
| | d20 = 0.000 | | |
| r21 = ∞ (Aperture Stop A) | | | |
| | d21 = 0.300 | | |
| r22 = 29.544 | | | |
| | d22 = 2.000 | N12 = 1.51680 | ν12 = 64.20 |
| r23 = 27.906 | | | |
| | d23 = 69.000 | | |
| (Rear Lens Unit Gr4R . . . Positive) | | | |
| r24 = −74.120 | | | |
| | d24 = 10.000 | N13 = 1.49700 | ν13 = 81.61 |
| r25 = −32.807 | | | |
| | d25 = 1.500 | | |
| r26 = −32.123 | | | |
| | d26 = 2.800 | N14 = 1.74950 | ν14 = 35.04 |
| r27 = −70.954 | | | |
| | d27 = 0.300 | | |
| r28 = 6887.527 | | | |
| | d28 = 6.500 | N15 = 1.49700 | ν15 = 81.61 |
| r29 = −76.053 | | | |
| | d29 = 0.300 | | |
| r30 = 106.272 | | | |
| | d30 = 6.500 | N16 = 1.49700 | ν16 = 81.61 |
| r31 = −194.921 | | | |
| | d31 = 5.000 | | |

TABLE 2-continued

<< Embodiment >>
f = 97.0~60.5~41.0
FNO = 3.00~3.00~3.00
S' = 7.931~7.931~7.931

| Radius of Curvature | Axial Distance | Refractive Index | Abbe Number |
|---|---|---|---|
| {Dichroic Prism PR} | | | |
| r32 = ∞ | | | |
| | d32 = 97.000 | N17 = 1.51680 | ν17 = 64.20 |
| r33 = ∞ | | | |

TABLE 3

<< Embodiment 3 >>
f = 97.0~60.5~41.0
FNO = 3.00~3.00~3.00
S' = 5.618~5.618~5.618

| Radius of Curvature | Axial Distance | Refractive Index | Abbe Number |
|---|---|---|---|
| {First Lens Unit Gr1 . . . Positive} | | | |
| r1 = 252.054 | | | |
| | d1 = 4.000 | N1 = 1.80518 | ν1 = 25.46 |
| r2 = 117.588 | | | |
| | d2 = 8.800 | N2 = 1.62041 | ν2 = 60.34 |
| r3 = −1762.767 | | | |
| | d3 = 0.300 | | |
| r4 = 118.022 | | | |
| | d4 = 5.000 | N3 = 1.62041 | ν3 = 60.34 |
| r5 = 360.194 | | | |
| | d5 = 58.457~29.776~1.200 | | |
| {Second Lens Unit Gr2 . . . Negative} | | | |
| r6 = 102.464 | | | |
| | d6 = 2.500 | N4 = 1.49700 | ν4 = 81.61 |
| r7 = 27.114 | | | |
| | d7 = 15.500 | | |
| r8 = −122.810 | | | |
| | d8 = 2.000 | N5 = 1.49700 | ν5 = 81.61 |
| r9 = 56.749 | | | |
| | d9 = 0.300 | | |
| r10 = 39.855 | | | |
| | d10 = 4.000 | N6 = 1.74950 | ν6 = 35.04 |
| r11 = 76.034 | | | |
| | d11 = 3.354~33.511~64.691 | | |
| {Third Lens Unit Gr3 ·· Negative} | | | |
| r12 = −71.613 | | | |
| | d12 = 1.500 | N7 = 1.49700 | ν7 = 81.61 |
| r13 = 45.146 | | | |
| | d13 = 3.000 | | |
| r14 = 45.905 | | | |
| | d14 = 3.000 | N8 = 1.74950 | ν8 = 35.04 |
| r15 = 67.478 | | | |
| | d15 = 6.000~4.523~1.919 | | |
| {Fourth Lens Unit Gr4 . . . Positive} | | | |
| (Front Lens Unit Gr4F . . . Positive) | | | |
| r16 = 114.769 | | | |
| | d16 = 4.000 | N9 = 1.49140 | ν9 = 57.82 |
| r17* = −61.000 | | | |
| | d17 = 0.300 | | |
| r18 = ∞ (Aperture Stop A) | | | |
| | d18 = 0.000 | | |
| r19 = 44.737 | | | |
| | d19 = 6.000 | N10 = 1.62041 | ν10 = 60.34 |
| r20 = −60.414 | | | |
| | d20 = 1.500 | N11 = 1.70154 | ν11 = 41.15 |
| r21 = 95.241 | | | |
| | d21 = 0.300 | | |
| r22 = 33.018 | | | |
| | d22 = 1.700 | N12 = 1.51680 | ν12 = 64.20 |

TABLE 3-continued

<< Embodiment 3 >>
f = 97.0~60.5~41.0
FNO = 3.00~3.00~3.00
S' = 5.618~5.618~5.618

| Radius of Curvature | Axial Distance | Refractive Index | Abbe Number |
|---|---|---|---|
| r23 = 27.520 | | | |
| | d23 = 58.000 | | |
| (Rear Lens Unit Gr4R . . . Positive) | | | |
| r24 = 616.333 | | | |
| | d24 = 10.300 | N13 = 1.49700 | ν13 = 81.61 |
| r25 = −39.350 | | | |
| | d25 = 1.500 | | |
| r26 = −38.959 | | | |
| | d26 = 2.800 | N14 = 1.74950 | ν14 = 35.04 |
| r27 = −92.977 | | | |
| | d27 = 0.300 | | |
| r28 = 2570.562 | | | |
| | d28 = 6.000 | N15 = 1.49700 | ν15 = 81.61 |
| r29 = −103.860 | | | |
| | d29 = 0.300 | | |
| r30 = 145.463 | | | |
| | d30 = 5.500 | N16 = 1.49700 | ν16 = 81.61 |
| r31 = −247.352 | | | |
| | d31 = 5.000 | | |
| {Dichroic Prism PR} | | | |
| r32 = ∞ | | | |
| | d32 = 105.500 | N17 = 1.51680 | ν17 = 64.20 |
| r33 = ∞ | | | |

[Aspherical Coefficients]

r17:  ε = 1.0000
      A4 = 0.39481 × 10$^{-6}$
      A6 = 0.13982 × 10$^{-9}$
      A8 = 0.43892 × 10$^{-12}$

TABLE 4

<< Embodiment 4 >>
f = 97.0~60.5~41.0
FNO = 3.00~3.00~3.00
S' = 10.200~10.200~10.200

| Radius of Curvature | Axial Distance | Refractive Index | Abbe Number |
|---|---|---|---|
| {First Lens Unit Gr1 . . . Positive} | | | |
| r1 = 307.976 | | | |
| | d1 = 4.500 | N1 = 1.80518 | ν1 = 25.46 |
| r2 = 123.281 | | | |
| | d2 = 8.800 | N2 = 1.62041 | ν2 = 60.34 |
| r3 = −859.247 | | | |
| | d3 = 0.300 | | |
| r4 = 106.105 | | | |
| | d4 = 6.500 | N3 = 1.62041 | ν3 = 60.34 |
| r5 = 505.623 | | | |
| | d5 = 48.053~24.111~1.000 | | |
| {Second Lens Unit Gr2 . . . Negative} | | | |
| r6 = 174.902 | | | |
| | d6 = 3.500 | N4 = 1.49700 | ν4 = 81.61 |
| r7 = 38.299 | | | |
| | d7 = 15.500 | | |
| r8 = −148.257 | | | |
| | d8 = 2.500 | N5 = 1.49700 | ν5 = 81.61 |
| r9 = 77.144 | | | |
| | d9 = 0.300 | | |
| r10 = 62.452 | | | |
| | d10 = 5.000 | N6 = 1.74000 | ν6 = 31.72 |
| r11 = 156.006 | | | |
| | d11 = 5.000~33.050~65.188 | | |

TABLE 4-continued

<< Embodiment 4 >>
f = 97.0~60.5~41.0
FNO = 3.00~3.00~3.00
S' = 10.200~10.200~10.200

| Radius of Curvature | Axial Distance | Refractive Index | Abbe Number |
|---|---|---|---|
| {Third Lens Unit Gr3 . . . Negative} | | | |
| r12 = −50.652 | | | |
| | d12 = 1.500 | N7 = 1.49700 | ν7 = 81.61 |
| r13 = 40.554 | | | |
| | d13 = 3.000 | | |
| r14 = 45.905 | | | |
| | d14 = 3.000 | N8 = 1.74950 | ν8 = 35.04 |
| r15 = 103.038 | | | |
| | d15 = 3.500~9.392~10.365 | | |
| {Fourth Lens Unit Gr4 . . . Positive} | | | |
| (Front Lens Unit Gr4F . . . Positive) | | | |
| r16 = 121.291 | | | |
| | d16 = 3.000 | N9 = 1.69680 | ν9 = 55.46 |
| r17 = −106.671 | | | |
| | d17 = 0.300 | | |
| r18 = ∞ (Aperture Stop A) | | | |
| | d18 = 0.300 | | |
| r19 = 45.893 | | | |
| | d19 = 5.200 | N10 = 1.62041 | ν10 = 60.34 |
| r20 = −62.585 | | | |
| | d20 = 1.500 | N11 = 1.70154 | ν11 = 41.15 |
| r21 = 108.002 | | | |
| | d21 = 1.800 | | |
| r22 = 274.767 | | | |
| | d22 = 1.700 | N12 = 1.51680 | ν12 = 64.20 |
| r23 = 37.738 | | | |
| | d23 = 46.000 | | |
| (Rear Lens Unit Gr4R . . . Positive) | | | |
| r24 = 252.709 | | | |
| | d24 = 11.000 | N13 = 1.49700 | ν13 = 81.61 |
| r25 = −39.366 | | | |
| | d25 = 1.500 | | |
| r26 = −38.598 | | | |
| | d26 = 2.800 | N14 = 1.74950 | ν14 = 35.04 |
| r27 = −95.968 | | | |
| | d27 = 0.300 | | |
| r28 = 770.879 | | | |
| | d28 = 6.000 | N15 = 1.49700 | ν15 = 81.61 |
| r29 = −80.760 | | | |
| | d29 = 0.300 | | |
| r30 = 115.076 | | | |
| | d30 = 6.000 | N16 = 1.49700 | ν16 = 81.61 |
| r31 = −273.497 | | | |
| | d31 = 5.000 | | |
| {Dichroic Prism PR} | | | |
| r32 = ∞ | | | |
| | d32 = 102.500 | N17 = 1.51680 | ν17 = 64.20 |
| r33 = ∞ | | | |

TABLE 5

<< Embodiment 5 >>
f = 97.0~60.5~41.0
FNO = 3.00~2.93~2.99
S' = 3.658~3.658~3.658

| Radius of Curvature | Axial Distance | Refractive Index | Abbe Number |
|---|---|---|---|
| {First Lens Unit Gr1 . . . Positive} | | | |
| r1 = 198.414 | | | |
| | d1 = 4.000 | N1 = 1.80518 | ν1 = 25.46 |
| r2 = 105.906 | | | |
| | d2 = 8.800 | N2 = 1.62041 | ν2 = 60.34 |

TABLE 5-continued

<< Embodiment 5 >>
f = 97.0~60.5~41.0
FNO = 3.00~2.93~2.99
S' = 3.658~3.658~3.658

| Radius of Curvature | Axial Distance | Refractive Index | Abbe Number |
|---|---|---|---|
| r3 = −5516.328 | | | |
| | d3 = 0.300 | | |
| r4 = 150.403 | | | |
| | d4 = 5.000 | N3 = 1.62041 | ν3 = 60.34 |
| r5 = 607.862 | | | |
| | d5 = 59.263~29.894~0.835 | | |
| {Second Lens Unit Gr2 . . . Negative} | | | |
| r6 = 132.603 | | | |
| | d6 = 2.500 | N4 = 1.43388 | ν4 = 95.00 |
| r7 = 29.843 | | | |
| | d7 = 15.500 | | |
| r8 = −97.971 | | | |
| | d8 = 2.000 | N5 = 1.43388 | ν5 = 95.00 |
| r9 = 75.321 | | | |
| | d9 = 0.300 | | |
| r10 = 45.266 | | | |
| | d10 = 4.000 | N6 = 1.74950 | ν6 = 35.04 |
| r11 = 77.174 | | | |
| | d11 = 4.000~31.978~62.221 | | |
| {Third Lens Unit Gr3 . . . Negative} | | | |
| r12 = −54.183 | | | |
| | d12 = 1.500 | N7 = 1.43388 | ν7 = 95.00 |
| r13 = 43.307 | | | |
| | d13 = 3.000 | | |
| r14 = 45.905 | | | |
| | d14 = 3.000 | N8 = 1.74950 | ν8 = 35.04 |
| r15 = 67.921 | | | |
| | d15 = 1.200 | | |
| r16 = ∞ (Aperture Stop A) | | | |
| | d16 = 1.800~3.191~2.007 | | |
| {Fourth Lens Unit Gr4 . . . Positive} | | | |
| (Front Lens Unit Gr4F . . . Positive) | | | |
| r17 = 486.251 | | | |
| | d17 = 3.000 | N9 = 1.69680 | ν9 = 55.46 |
| r18 = −80.411 | | | |
| | d18 = 0.300 | | |
| r19 = 44.843 | | | |
| | d19 = 5.200 | N10 = 1.62041 | ν10 = 60.34 |
| r20 = −60.001 | | | |
| | d20 = 1.500 | N11 = 1.70154 | ν11 = 41.15 |
| r21 = 90.675 | | | |
| | d21 = 0.300 | | |
| r22 = 36.764 | | | |
| | d22 = 1.700 | N12 = 1.43388 | ν12 = 95.00 |
| r23 = 29.328 | | | |
| | d23 = 48.000 | | |
| (Rear Lens Unit Gr4R . . . Positive) | | | |
| r24 = 635.437 | | | |
| | d24 = 10.300 | N13 = 1.43388 | ν13 = 95.00 |
| r25 = −36.680 | | | |
| | d25 = 1.500 | | |
| r26 = −36.802 | | | |
| | d26 = 2.800 | N14 = 1.74950 | ν14 = 35.04 |
| r27 = −67.133 | | | |
| | d27 = 0.300 | | |
| r28 = 376.631 | | | |
| | d28 = 6.000 | N15 = 1.43388 | ν15 = 95.00 |
| r29 = −92.979 | | | |
| | d29 = 0.300 | | |
| r30 = 115.076 | | | |
| | d30 = 5.500 | N16 = 1.43388 | ν16 = 95.00 |
| r31 = −275.071 | | | |
| | d31 = 5.000 | | |

TABLE 5-continued

<< Embodiment 5 >>
f = 97.0~60.5~41.0
FNO = 3.00~2.93~2.99
S' = 3.658~3.658~3.658

| Radius of Curvature | Axial Distance | Refractive Index | Abbe Number |
|---|---|---|---|
| {Dichroic Prism PR} | | | |
| r32 = ∞ | | | |
| | d32 = 105.500 | N17 = 1.51680 | ν17 = 64.20 |
| r33 = ∞ | | | |

TABLE 6

| Condition | | Emb. 1 | Emb. 2 | Emb. 3 | Emb. 4 | Emb. 5 |
|---|---|---|---|---|---|---|
| | Θ | 0.5387 | 0.5432 0.5387 | 0.5387 | 0.5387 | 0.5417 |
| (2) | νd | 81.61 | 69.75 81.61 | 81.61 | 81.61 | 95 |
| (1) | Θ − (0.644 − 0.00168 · νd) | 0.0318 | 0.0164 0.0318 | 0.0318 | 0.0318 | 0.0573 |
| (3) | fW · φFT | −0.091 | 0.082 | −0.033 | −0.164 | −0.087 |
| (4) | \|φ2\| · fW | 0.619 | 0.619 | 0.738 | 0.540 | 0.619 |
| (5) | φ1/\|φ2\| | 0.364 | 0.283 | 0.305 | 0.488 | 0.364 |
| | Aperture Stop A | Gr4 | Gr4 | Gr4 | Gr4 | Gr3 |
| | Notes | — | — | Aspherical surface in Gr4. | Gr1 moved for zooming. | — |

What is claimed is:

1. A variable magnification optical system comprising, from an enlargement side:

a first lens unit having a positive optical power;

a second lens unit having a negative optical power and including a first negative lens element, the second lens unit being adapted to move along an optical axis direction to accomplish varying the magnification of the optical system;

a third lens unit having a negative optical power and including a second negative lens element, the third lens unit being adapted to move along the optical axis direction to accomplish varying of the magnification of the optical system; and a fourth lens unit having a positive optical power and including a first positive lens element, the fourth lens unit being fixed in the optical axis direction, wherein optical materials of said first negative lens element, the second negative lens element, and the first positive lens element fulfill the following conditions:

$$0.015 < \Theta - (0.644 - 0.00168 \cdot \nu d) < 0.06$$

$$65 < \nu d < 100$$

where $$\Theta = (ng - nF)/(nF - nC); \text{ and}$$

$$\nu d = (nd - 1)/(nF - nC);$$

where ng represents a refractive index for g-line (whose wavelength is 435.84 nm);

nF represents a refractive index for F-line (whose wavelength is 486.13 nm);

nC represents a refractive index for C-line (whose wavelength is 656.28 nm); and nd represents a refractive index for d-line (whose wavelength is 587.56 nm).

2. A variable magnification optical system as claimed in claim 1, wherein the fourth lens unit comprises, from the enlargement side, a front lens unit having a positive optical power and a rear lens unit having a positive optical power, wherein the first lens unit, the second lens unit, the third lens unit, and the front lens unit of the fourth lens unit together comprise a substantially afocal optical system.

3. A variable magnification optical system as claimed in claim 2, wherein the following condition is fulfilled:

$$-0.2 < fW \cdot \phi FT < 0.15$$

where fW represents a focal length of the optical system at a shortest focal length; and $\phi FT$ represents a composite optical power of the first lens unit, the second lens unit, the third lens unit, and the front lens unit of the fourth lens unit at a longest focal length condition.

4. A variable magnification optical system as claimed in claim 2, wherein the following condition is fulfilled:

$$0.5 < |\phi 2| \cdot fW < 0.8$$

where $\phi 2$ represents an optical power of the second lens unit; and fW represents a focal length of the entire optical system at a shortest focal length.

5. A variable magnification optical system as claimed in claim 2, wherein the following condition is fulfilled:

$$0.25 < \phi 1/|\phi 2| < 0.5$$

where $\phi 1$ represents an optical power of the first lens unit; and $\phi 2$ represents an optical power of the second lens unit.

6. A variable magnification optical system as claimed in claim 2, wherein an aperture stop is provided substantially at an enlargement side focal point of the rear lens unit of the fourth lens unit.

7. A variable magnification optical system as claimed in claim 6, wherein the enlargement side focal point of the rear lens unit of the fourth lens unit coincides with a point located in the front lens of the fourth lens unit.

8. A variable magnification optical system as claimed in claim 6, wherein the enlargement side focal point of the rear lens unit of the fourth lens unit coincides with a point located in the third lens unit.

9. A variable magnification optical system as claimed in claim 1, wherein said first lens unit is fixed in the optical axis direction during the varying of the magnification of the entire optical system.

10. A variable magnification optical system as claimed in claim 1, wherein the first lens unit is adapted to move in the optical axis direction to accomplish varying the magnification of the optical system.

11. A method for correcting lateral chromatic aberration in a variable magnification optical system, the optical system comprising, from an enlargement side:

a first lens unit having a positive optical power;

a second lens unit having a negative optical power and including a first negative lens element, the second lens unit being adapted to move along an optical axis direction during varying the magnification of the optical system;

a third lens unit having a negative optical power and including a second negative lens element, the third lens unit being adapted to move along the optical axis direction during varying the magnification of the optical system; and a fourth lens unit having a positive optical power and including a first positive lens element, the fourth lens unit being adapted to be fixed in the optical axis direction during varying of the magnification of the optical system;

wherein the lateral chromatic aberration is corrected by selecting optical materials of the first negative lens element, the second negative lens element, and the first positive lens element so that the materials fulfill the following conditions:

$$0.015 < \Theta - (0.644 - 0.00168 \cdot vd) < 0.06$$

$$65 < vd < 100$$

where $\Theta = (ng-nF)/(nF-nC)$; and $vd = (nd-1)/(nF-nC)$;

where ng represents a refractive index for g-line (whose wavelength is 435.84 nm);

nF represents a refractive index for F-line (whose wavelength is 486.13 nm);

nC represents a refractive index for C-line (whose wavelength is 656.28 nm); and nd represents a refractive index for d-line (whose wavelength is 587.56 nm).

12. A method for providing a variable magnification optical system taking lateral chromatic aberration into account, the method comprising, in order from an enlargement side, the steps of:

providing a first lens unit having a positive optical power;

providing a second lens unit having a negative optical power and including a first negative lens element, the second lens unit being adapted to move along an optical axis to accomplish varying the magnification of the optical system;

providing a third lens unit having a negative optical power and including a second negative lens element, the third lens unit being adapted to move along the optical axis to accomplish varying the magnification of the optical system; and providing a fourth lens unit having a positive optical power and including a first positive lens element, the fourth lens unit being adapted to be fixed along the optical axis during varying of the magnification of the optical system;

wherein optical materials of the first negative lens element, the second negative lens element, and the first positive lens element fulfill the following conditions:

$$0.015 < \Theta - (0.644 - 0.00168 \cdot vd) < 0.06$$

$$65 < vd < 100$$

where $\Theta = (ng-nF)/(nF-nC)$; and $vd = (nd-1)/(nF-nC)$;

where
- ng represents a refractive index for g-line (whose wavelength is 435.84 nm);
- nF represents a refractive index for F-line (whose wavelength is 486.13 nm);
- nC represents a refractive index for C-line (whose wavelength is 656.28 nm); and
- nd represents a refractive index for d-line (whose wavelength is 587.56 nm).

13. A method for forming a variable magnification optical system taking lateral chromatic aberration into account, the method comprising the steps of:

- selecting a first lens unit having a positive optical power;
- selecting a second lens unit having a negative optical power and including a first negative lens element, the second lens unit adapted to being moveable along an optical axis to accomplish varying the magnification of the optical system;
- selecting a third lens unit having a negative optical power and including a second negative lens element, the third lens unit being adapted to being moveable along the optical axis to accomplish varying the magnification of the optical system;
- selecting a fourth lens unit having a positive optical power and including a first positive lens element, the fourth lens unit being fixed along the optical axis during varying the magnification of the optical system; and
- combining, in order from an enlargement side, the first lens unit, the second lens unit, the third lens unit, and the fourth lens unit into the variable magnification optical system;
- wherein optical materials of the first negative lens element, the second negative lens element, and the first positive lens element fulfill the following conditions:

$$0.015 < \Theta - (0.644 - 0.00168 - d) < 0.06$$

$$65 < \nu d < 100$$

where $$\Theta = (ng - nF)/(nF - nC); \text{ and}$$

$$\nu d = (nd - 1)/(nF - nC);$$

where
- ng represents a refractive index for g-line (whose wavelength is 435.84 nm);
- nF represents a refractive index for F-line (whose wavelength is 486.13 nm);
- nC represents a refractive index for C-line (whose wavelength is 656.28 nm); and
- nd represents a refractive index for d-line (whose wavelength is 587.56 nm).

* * * * *

UNITED STATES PATENT AND TRADEMARK OFFICE
CERTIFICATE OF CORRECTION

PATENT NO : 6,028,715
DATED : February 22, 2000
INVENTOR(S): Katsuhiro TAKAMOTO and Masakuni TAI It is certified that error appears in the above-identified patent and that said Letters Patent is hereby corrected as shown below:

Column 22, line 9 (claim 13, line 27 (first formula)), delete

"$0.015 < \Theta - (0.644 - 0.00168 - d) < 0.06$", and insert

"$0.015 < \Theta - (0.644 - 0.00168 \cdot \nu d) < 0.06$".

Signed and Sealed this

Eighth Day of May, 2001

Attest:

NICHOLAS P. GODICI

Attesting Officer

Acting Director of the United States Patent and Trademark Office